US012446204B2

United States Patent
Augustine et al.

(10) Patent No.: US 12,446,204 B2
(45) Date of Patent: Oct. 14, 2025

(54) SRAM WITH P-TYPE ACCESS TRANSISTORS AND COMPLEMENTARY FIELD-EFFECT TRANSISTOR TECHNOLOGY

(71) Applicant: Intel Corporation, Santa Clara, CA (US)

(72) Inventors: Charles Augustine, Portland, OR (US); Seenivasan Subramaniam, Hillsboro, OR (US); Patrick Morrow, Portland, OR (US); Muhammad M. Khellah, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 714 days.

(21) Appl. No.: 17/686,241

(22) Filed: Mar. 3, 2022

(65) Prior Publication Data
US 2023/0284427 A1 Sep. 7, 2023

(51) Int. Cl.
*H10B 10/00* (2023.01)
*G11C 11/412* (2006.01)
*G11C 11/419* (2006.01)

(52) U.S. Cl.
CPC ........... *H10B 10/12* (2023.02); *G11C 11/412* (2013.01); *G11C 11/419* (2013.01)

(58) Field of Classification Search
CPC .... H10B 10/12; H10B 10/125; G11C 11/412; G11C 11/419; H10D 84/0186; H10D 84/038; H10D 84/85; H10D 88/00; H10D 89/10; H10D 84/0172

USPC .......................................... 365/156
See application file for complete search history.

(56) References Cited

U.S. PATENT DOCUMENTS

| 9,208,858 B1 * | 12/2015 | Lin ......................... G11C 8/16 |
| 9,251,888 B1 * | 2/2016 | Liaw ..................... H01L 23/528 |
| 2022/0102362 A1 * | 3/2022 | Chanemougame .... H10D 84/85 |
| 2023/0189497 A1 * | 6/2023 | Huyghebaert ....... H10B 10/125 257/288 |

(Continued)

OTHER PUBLICATIONS

Toshiro Hiramoto, "Five nanometre CMOS technology," Nature Electronics, vol. 2, Dec. 2019, 2 pages.

(Continued)

*Primary Examiner* — Fernando Hidalgo
(74) *Attorney, Agent, or Firm* — Schwabe, Williamson & Wyatt, P.C.

(57) ABSTRACT

Embodiments herein relate to scaling of Static Random Access Memory (SRAM) cells. An SRAM cell include nMOS transistors on one level above pMOS transistors on a lower level. Transistors on the two levels can have overlapping footprints to save space. Additionally, the SRAM cell can use pMOS access transistors in place of nMOS access transistors to allow reuse of areas of the cell which would otherwise be used by the nMOS access transistors. In one approach, gate interconnects are provided in these areas, which have an overlapping footprint with underlying pMOS access transistors to save space. The SRAM cells can be connected to bit lines and word lines in overhead and/or bottom metal layers. In another aspect, SRAM cells of a column are connected to bit lines in an overlying M0 metal layer and an underlying BM0 metal layers to reduce capacitance.

20 Claims, 24 Drawing Sheets

(56) References Cited

U.S. PATENT DOCUMENTS

| | | | |
|---|---|---|---|
| 2023/0197154 A1* | 6/2023 | Chen | G11C 15/04 |
| | | | 365/49.11 |
| 2024/0206145 A1* | 6/2024 | Liu | H01L 23/5286 |
| 2024/0282364 A1* | 8/2024 | You | H10B 10/12 |

OTHER PUBLICATIONS

Khellah et al., "Process, Temperature, and Supply-Noise Tolerant 45 nm Dense Cache Arrays With Diffusion-Notch-Free (DNF) 6T SRAM Cells and Dynamic Multi-Vcc Circuits," IEEE Journal of Solid-State Circuits, vol. 44, No. 4, Apr. 2009, 10 pages.

Ryckaert et al., "The Complementary FET (CFET) for CMOS scaling beyond N3," 2018 Symposium on VLSI Technology Digest of Technical Papers, 2 pages.

* cited by examiner

| Version | BL/BLB | WL | Note: |
|---|---|---|---|
| 1 | M2 | M1 | No BCGN, use M2 BL, use VGX, use VTX |
| 2 | BM0 | M1 | No BCGN, use BM0 for signal, use VGX, no VTX |
| 3 | BM0 | M1 | No BCGN, wider BL/BLB, use BM0 for signal, use VGX, no VTX |
| 4 | BM0 | BM1 | No BCGN, no VGX, no VTX, use BM0 and BM1 for signal |

Fig. 7

|  | SRAM: | P-SRAM w/CFET: |
|---|---|---|
| Area | 1x | 0.52x |
| WL-driver | non-inverted | inverted |
| RD-assist | WL under-drive (VCC−ΔV1) | WL over-drive (Vss+ΔV2) |
| WR-assist | VCC collapse or NBL | Vss collapse or BL boosting |

WL 1271  BL 1272  VCC 1273  BLB 1274  WL 1275

FS M0

VSS 1270

Fig. 12C

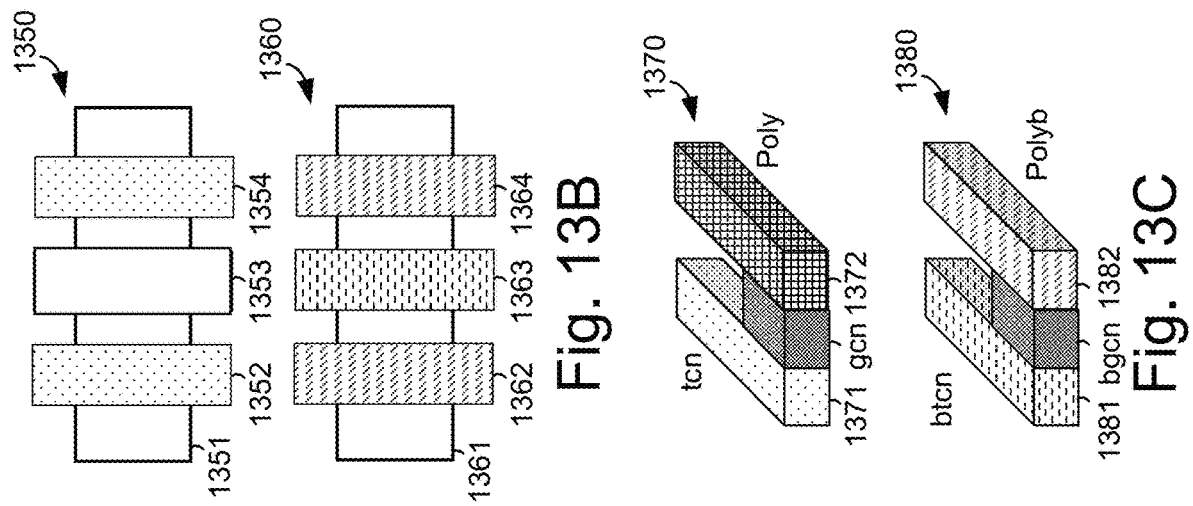
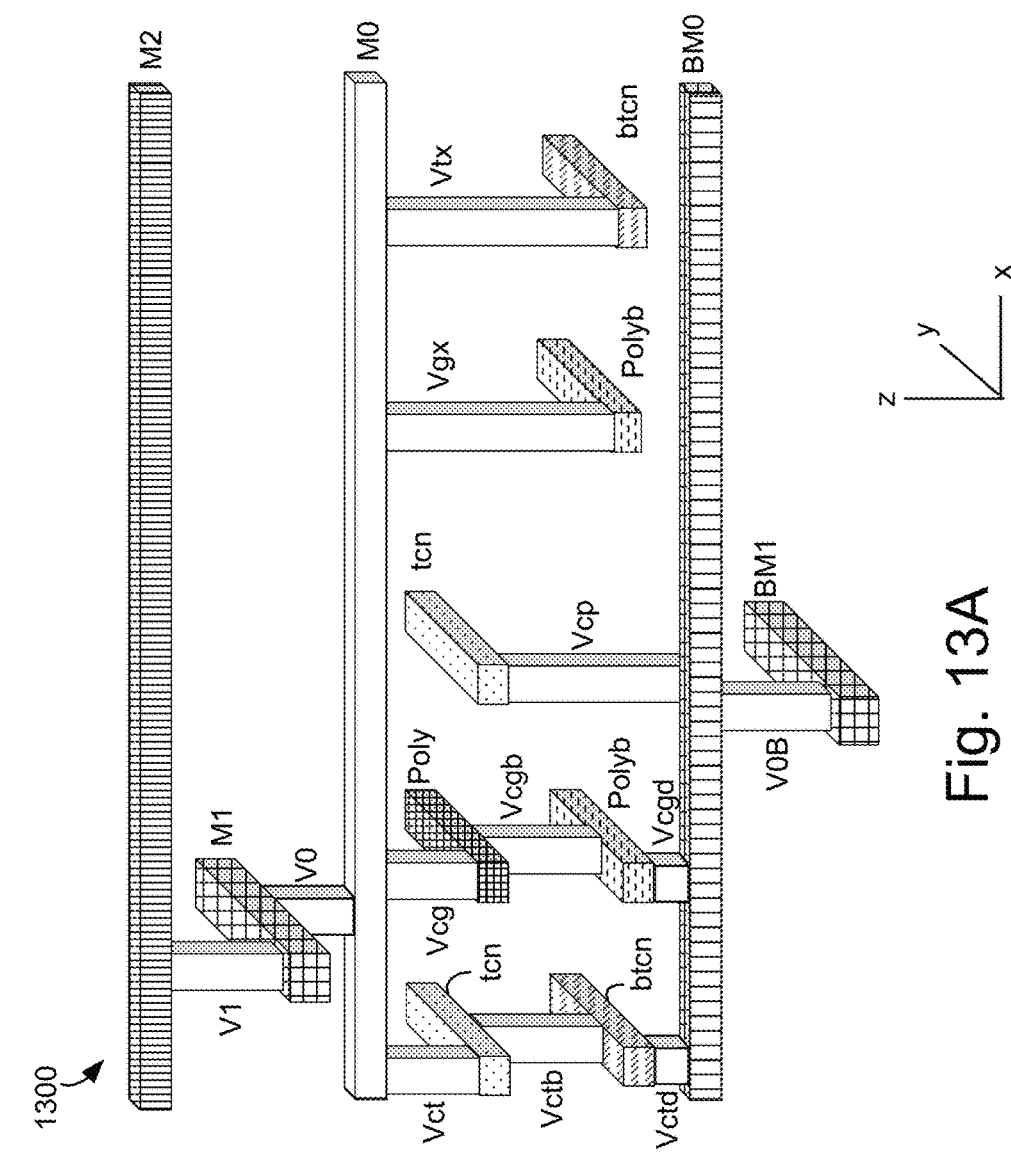
Fig. 13A  Fig. 13B  Fig. 13C

SRAM WITH P-TYPE ACCESS TRANSISTORS AND COMPLEMENTARY FIELD-EFFECT TRANSISTOR TECHNOLOGY

FIELD

The present application generally relates to the field of memory devices and more particularly, to a static random access memory (SRAM).

BACKGROUND

Memory devices include both volatile and non-volatile memory. The demand for memories has been increasing as larger on-die caches are employed such as in high-performance processors. This demand is further amplified due to the integration of accelerators such as Tile Matrix Multiply (TMUL) units, Advanced Vector Extensions (AVX) and Vision Processing Units (VPU) to support new workloads. Static Random Access Memory (SRAM) is a default candidate for supporting these workloads and providing on-chip high density memory. However, SRAM faces scalability issues due to lithography challenges associated with process scaling.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 7 depicts a table of example versions of a P-SRAM cell with CFET technology which reduces the cell area compared to FIGS. 5 and 6A-6C in accordance with various embodiments.

FIG. 8 depicts a table of comparisons between a SRAM cell with or without CFET technology and a P-SRAM cell with CFET technology in accordance with various embodiments.

FIG. 12C depicts an example plan view of a front side M0 layer and a back side BM0 layer of a cell consistent with Version 4 of FIG. 7, in accordance with various embodiments.

FIG. 13A depicts an example perspective view of different layers and vias that are supported in CFET technology, in accordance with various embodiments.

FIG. 13B depicts an example view of an nMOS transistor 1350 and pMOS transistor 1360 consistent with FIG. 13A, and in accordance with various embodiments.

FIG. 13C depicts an example view of a first structure 1370 and a second structure 1380 consistent with FIG. 13A, and in accordance with various embodiments.

DETAILED DESCRIPTION

Figure 2:
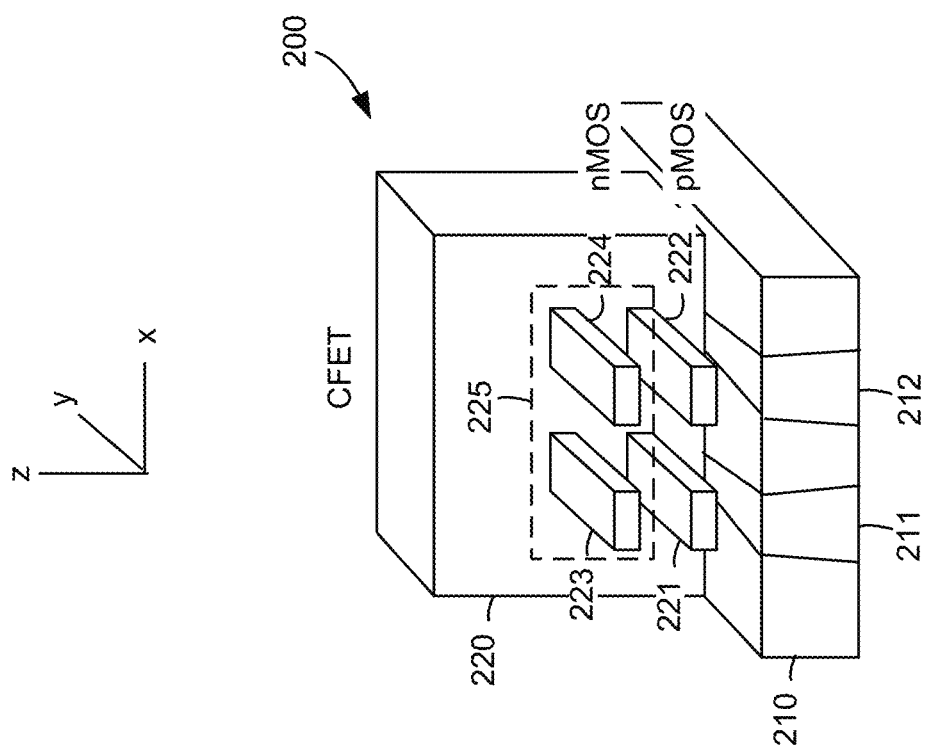
FIG. 2 depicts a perspective view of a complementary field-effect transistor (CFET) in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

As mentioned at the outset, various challenges are presented in scaling memory devices such as SRAM even though the logic continues to scale across technology generations. In one approach, 3D complementary transistors are used to improve transistor scaling where p-type and n-type metal-oxide semiconductor transistors (pMOS and nMOS, respectively) are vertically integrated in the same footprint, thereby achieving 50% area scaling in Complementary Metal-Oxide-Semiconductor (CMOS) gates. A pMOS transistor is one in which p-type dopants are used in the gate region, e.g., the channel, and 0 V or a negative voltage on the control gate turns the device on (to a conductive state). An nMOS transistor is one in which n-type dopants are used in the gate region and a positive voltage on the control gate turns the device on.

Figure 3B:
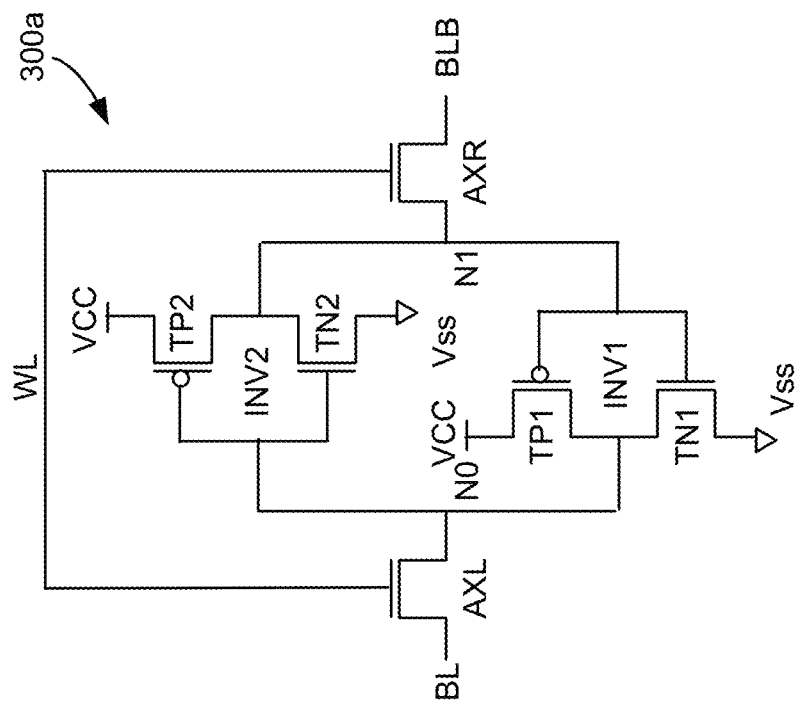
FIG. 3B depicts the circuit diagram of FIG. 3A where the nMOS and pMOS transistors of the inverters are shown, in accordance with various embodiments.
Figure 3A:
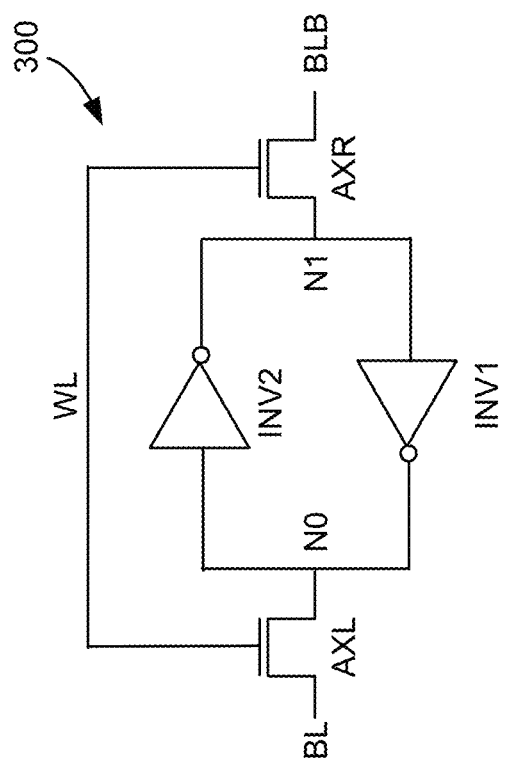
FIG. 3A depicts an example circuit diagram of a 6T SRAM memory cell with nMOS access transistors in accordance with various embodiments.

An SRAM cell typically include six transistors, including two nMOS access transistors AXL and AXR which connect to respective nodes N0 and N1 (FIGS. 3A and 3B). The cell also includes two inverters, INV1 and INV2, which each comprise an nMOS and a pMOS, for a total of four nMOS transistors and two pMOS transistors. In an SRAM device, the memory cells are arranged in rows and columns, where each row is associated with a word line and each column is associated with a pair of bit lines. In a read operation, for example, a row of cells is selected. For each selected cell, the associated pair of bit lines is pre-charged and the cell communicates with the bit lines so that voltages develop on the bit lines based on the data stored in the cell. An associated sense amplifier (sense amp) is then enabled to detect the bit line voltages and output a corresponding bit of data.

In the six-transistor (6T) SRAM cell, the INV1 and INV2 area can scale (be reduced in size) by 50% due to having an equal number of pMOS and nMOS transistors. However, the access transistors cannot not scale in area. In this case, the net area is four transistors×50% (INV1 and INV2) and two transistors with no scaling, resulting in four equivalent transistors with a theoretical scaling ratio of 4/6~66.6%. Based on initial layouts of the SRAM bit-cell, it has been determined that the bit-cell area does not scale very well despite using Complementary Field-Effect Transistor (CFET) technology. This is due to non-scalability of routing resources needed for the cross-coupled nodes N0 and N1 as well as for the connection between the bit-cell and the two bit lines and one word line. Hence, transistor scaling or front-end (FE) scaling is not sufficient to improve the SRAM bit-cell area. This further aggravates the scaling disparity between logic and memory in future technology nodes.

The techniques disclosed herein address the above and other issues. In one aspect, SRAM and CFET technology are used to provide front end SRAM topologies and interconnects and/or back-end technologies that enable 50% area scaling, thus keeping in parity with logic scaling. The techniques can use pMOS access transistors in place of nMOS access transistors to allow reuse of an area of the cell which would otherwise be used by the nMOS access transistors. In one approach, interconnects are provided in this area. A number of variations are provided.

In one approach, the nMOS transistors which would otherwise be stacked on top of the pMOS access transistors in a CFET structure are removed. The channel is oxidized and the resultant space is used for a for poly-to-diffusion gate contact (GCN) connection for the cross-coupled nodes N0 and N1 of the cell. This enables the SRAM cell height to decrease by about one-half, thus achieving significant area scaling.

In another aspect, SRAM cells in a column are connected to metal 0 layer (M0) bit lines and bottom metal 0 layer (BM0) bit lines, where the bit lines are connected to a sense amp. A smaller number of cells which are furthest from the sense amp are connected to M0 or BM0, while a larger number of cells which are closest to the sense amp are connected to BM0 or M0, respectively. This can involve routing the primary bit line BL and the complementary bit line BLB using the backside BM0 instead of the front side M0.

The bit lines can be shielded by a metal line which carries a voltage VCC. This enables lower capacitive coupling between BL and BLB, which can improve noise immunity during write and read operations.

The techniques can leverage P-SRAM or P-cell technology which enables a diffusion-notch-free (DNF) SRAM. P-SRAM or P-cell technology denote an SRAM having pMOS access transistors.

These and other features will be apparent in view of the following discussion.

Figure 1:
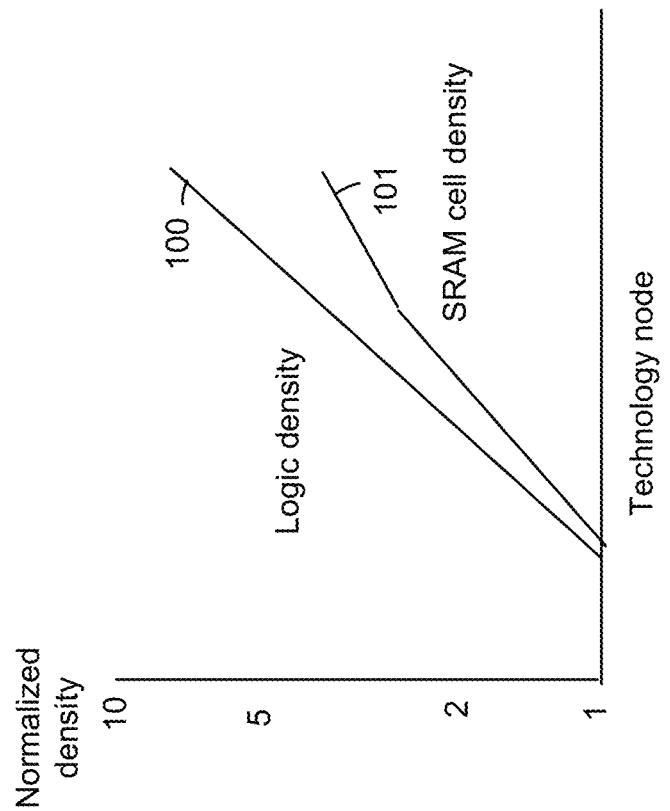
FIG. 1 depicts plots of normalized density versus technology node for logic density (plot 100) and SRAM cell density (plot 101) in accordance with various embodiments.

FIG. 1 depicts plots of normalized density versus technology node for logic density (plot 100) and SRAM cell density (plot 101) in accordance with various embodiments. As mentioned, logic density continues to increase in proportion to the technology node, which represents an increasingly smaller dimension along the horizontal axis. However, SRAM cell density has increased at a lower rate, resulting in a disparity between logic and SRAM scaling across technology generations. The techniques provided herein address this issue by improving SRAM cell density.

FIG. 2 depicts a perspective view of a complementary field-effect transistor (CFET) 200 in accordance with various embodiments. CFET technology provides vertical integration of pMOS and nNMOS transistors. In this example, a substrate region 210 include metal lines 211 and 212. An elevated region 220 includes pMOS diffusion regions 221 and 222 and nMOS diffusion regions 223 and 224 which are vertically above, in the z direction, the pMOS diffusion regions 221 and 222, respectively. The nMOS diffusion regions may overlay, and have an overlapping footprint with, the pMOS diffusion regions. The substrate extends in an x-y plane. As mentioned, the nMOS diffusion region can be omitted to provide a region 225 which can be used for interconnects.

FIG. 3A depicts an example circuit diagram of a 6T SRAM memory cell 300 with nMOS access transistors in accordance with various embodiments. The cell includes inverters INV1 and INV2 and cross-coupled nodes N0 and N1. N0 can be coupled to the primary bit line BL by a left-side nMOS access transistor AXL, and N1 can be coupled to the complementary bit line BLB by a right-side nMOS access transistor AXR. The control gates of the access transistors are connected to a word line WL. Enabling the WL electrically connects BL to N0 and BLB to N1. N0 and N1 provide complementary bit values, where the bit value at node N0 is considered to be the value stored by the memory cell.

FIG. 3B depicts the circuit diagram of FIG. 3A where the nMOS and pMOS transistors of the inverters are shown, in accordance with various embodiments. In the SRAM memory cell 300a, each inverter comprises a pMOS transistor connected in series with an nMOS transistor where the two transistors have coupled control gates. For example, INV2 includes a pMOS transistor TP2 coupled to a positive voltage VCC at a source side and to an nMOS transistor TN2 at a drain side. The nMOS transistor TN2 in turn is connected to ground at its source side. Similarly, INV1 includes a pMOS transistor TP1 coupled to a positive voltage VCC at a source side and to an nMOS transistor TN1 at a drain side. TN1 in turn is coupled to ground at its source side.

Figure 4B:
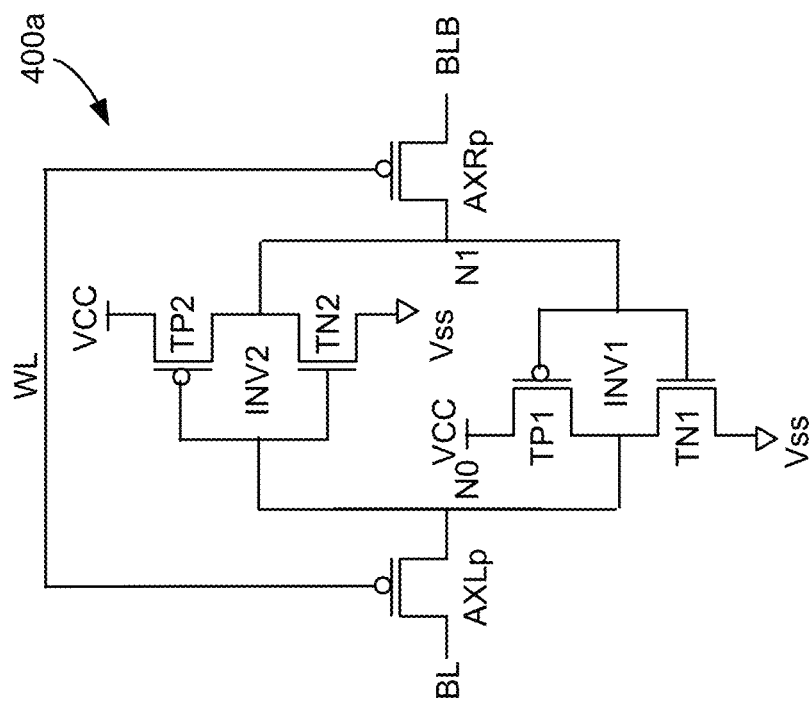
FIG. 4B depicts the circuit diagram of FIG. 4A where the nMOS and pMOS transistors of the inverters are shown, in accordance with various embodiments.
Figure 4A:
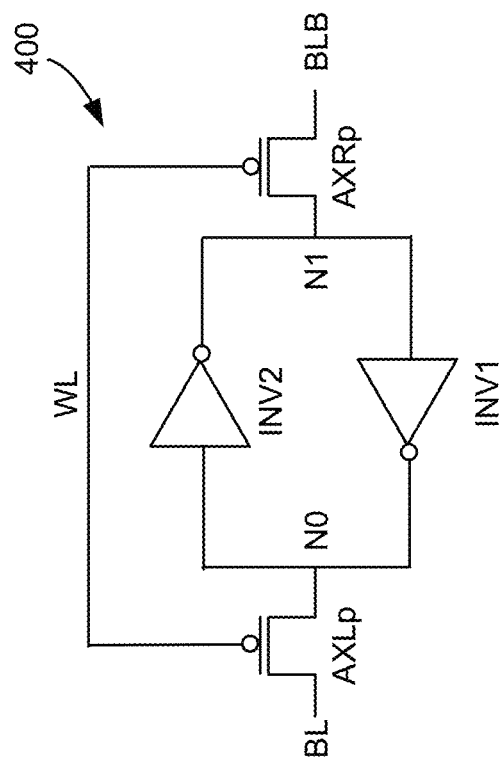
FIG. 4A depicts an example circuit diagram of a 6T SRAM memory cell with pMOS access transistors in accordance with various embodiments.

FIG. 4A depicts an example circuit diagram of a 6T SRAM memory cell 400 with pMOS access transistors in accordance with various embodiments. The cell includes inverters INV1 and INV2 and cross-coupled nodes N0 and N1. N0 can be coupled to the primary bit line BL by a left-side pMOS access transistor AXLp, and N1 can be coupled to the complementary bit line BLB by a right-side pMOS access transistor AXRp. The control gates of the access transistors are connected to a word line WL. Enabling the WL electrically connects BL to N0 and BLB to N1. N0 and N1 provide complementary bit values, where the bit value at node N0 is considered to be the value stored by the memory cell.

FIG. 4B depicts the circuit diagram of FIG. 4A where the nMOS and pMOS transistors of the inverters are shown, in accordance with various embodiments. In the SRAM memory cell 400a, INV2 includes a pMOS transistor TP2 coupled to a positive voltage VCC at a source side and to an nMOS transistor TN2 at a drain side. The nMOS transistor TN2 in turn is connected to ground at its source side. Similarly, INV1 includes a pMOS transistor TP1 coupled to a positive voltage VCC at a source side and to an nMOS transistor TN1 at a drain side. TN1 in turn is connected to ground at its source side.

Figure 5:
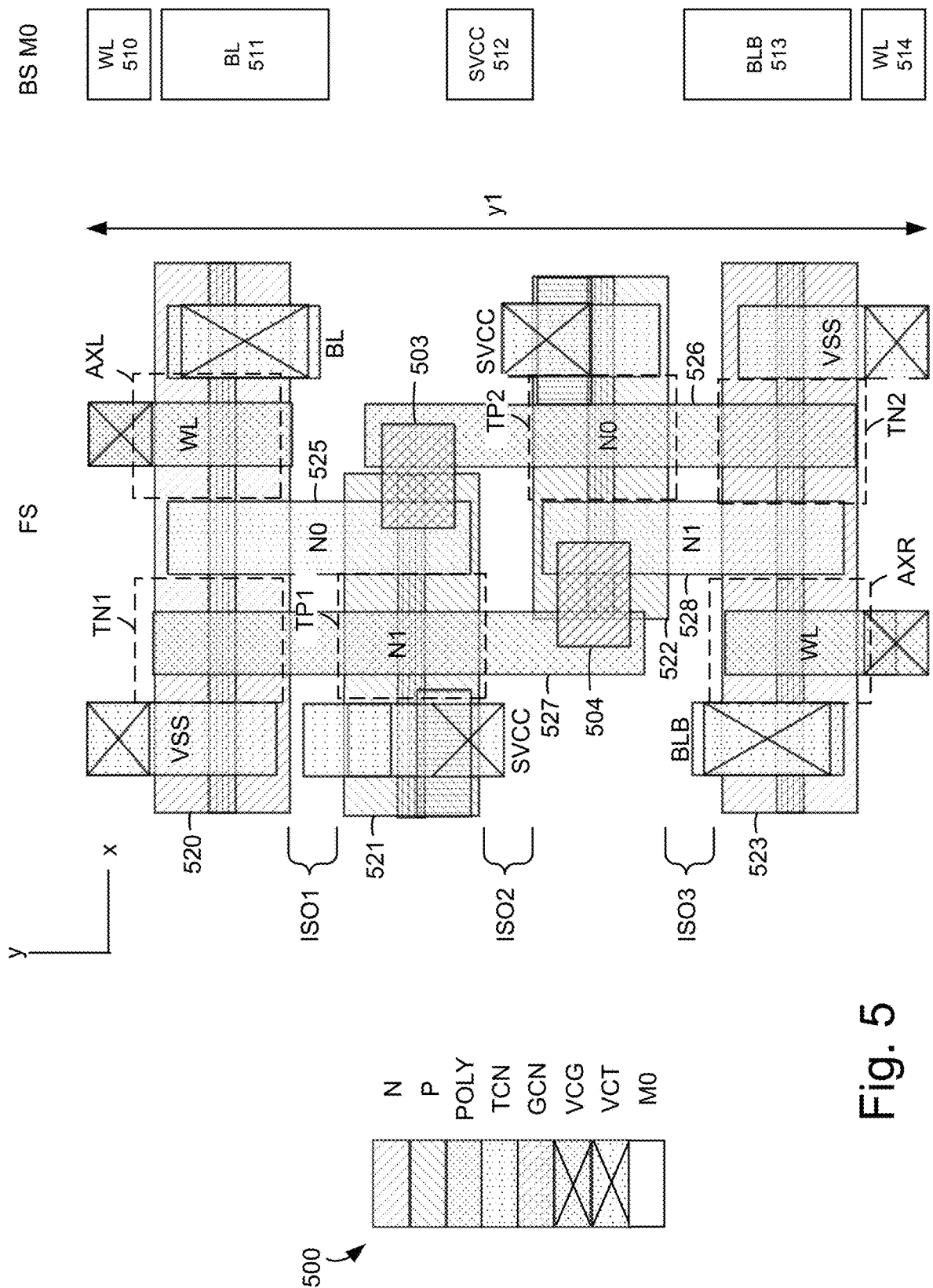
FIG. 5 depicts an example plan view of a baseline SRAM cell without CFET technology in accordance with various embodiments.

FIG. 5 depicts an example plan view of a baseline SRAM cell without CFET technology in accordance with various embodiments. This is a comparative example of an SRAM cell which indicates the cell height y1 before scaling using the techniques disclosed herein. The view is in the x-y plane looking from a top or front side of the cell (a side of the cell facing away from the substrate on which the cell if formed). The bottom or back side of the cell is a side of the cell facing the substrate. Various regions are depicted with patterns which are used consistency in the different figures. See the key 500. A region with an X generally denotes a via extending in the z direction, either toward or away from the substrate. The regions are depicted with some transparency so that underlying regions remain visible. As depicted in the key, the regions include an n-type diffusion region (N), a p-type diffusion region (P), a polysilicon region (POLY), a trench contact region (TCN), denoting a contact to a source or drain region, a gate contact region (GCN), denoting a contact to a control gate of a transistor, VCG, VCT and a metal zero layer (M0), denoting a first metal layer. Regions labelled with VSS receive a voltage such as ground (0 V).

FS denotes the front side or top side of the cell. BS denotes the back side or bottom side of the cell. The cell has a height or length y1 along they direction.

BS M0 denotes a back side M0 layer. Successive metal layers above the cell are M0, M1, M2 . . . and successive metal layers below the cell are BM0, BM1, BM2 . . . The M0 layer includes a WL portion 510, a BL portion 511, denoting the primary bit line, a SVCC portion 512, denoting a conductive path providing a voltage at a level VCC, a BLB portion 513, denoting the complementary bit line, and another word line portion 514. The different word line portions for a cell are electrically connected to one another using paths not shown. The vias are connected to these M0 portions. See also FIG. 13A for further examples of potential connections of the vias.

The components N0, N1 and WL correspond to FIGS. 3A and 3B. A GCN region 503 connects diffusion N0 region 525 and POLY N0 region 526 and a GCN region 504 connects diffusion N1 regions 527 and POLY N1 region 528. The p-type regions 521 and 522 are arranged between the n-type regions 520 and 523. The p-type regions and n-type regions are all arranged laterally of one another at a common elevation in the z direction. The p-type regions and n-type regions may comprise diffusion regions which are separated by isolation regions ISO1-ISO3 in a substrate, for example.

The transistors of the SRAM cell of FIGS. 3A and 3B are also depicted, including AXL, AXR, TP1, TP2, TN1 and TN2. In particular, the transistors TN1 and AXL are provided in the n-type region 520, the transistor TP1 is provided in the p-type region 521, the transistor TP2 is provided in the p-type region 522 and the transistors AXR and TN2 are provided in the n-type region 523. If the transistors AXL and AXR are removed, the corresponding regions become dummy nMOS areas which can be used for other purposes and to enhance scaling. Since the dummy nMOS areas are not used for GCN (diffusion to poly) connections, the cell height (in the y direction) does not scale with front end (FE) scaling alone. Instead, with the techniques herein, the regions/locations of the two dummy nMOS transistors can be used to provide front side GCN (diffusion to poly) regions or connections) to cross-couple the N0 and N1 connections. For example, see the connections 903 and 904 in FIG. 9A, 1003 and 1004 in FIG. 10A, and 1203 and 1204 in FIG. 12A.

As mentioned, the space associated with two dummy nMOS transistors in the P-SRAM cell are used instead for cross-couple connections N0 and N1. Various examples of front side and backside connectivity are provided below.

Figure 6A:
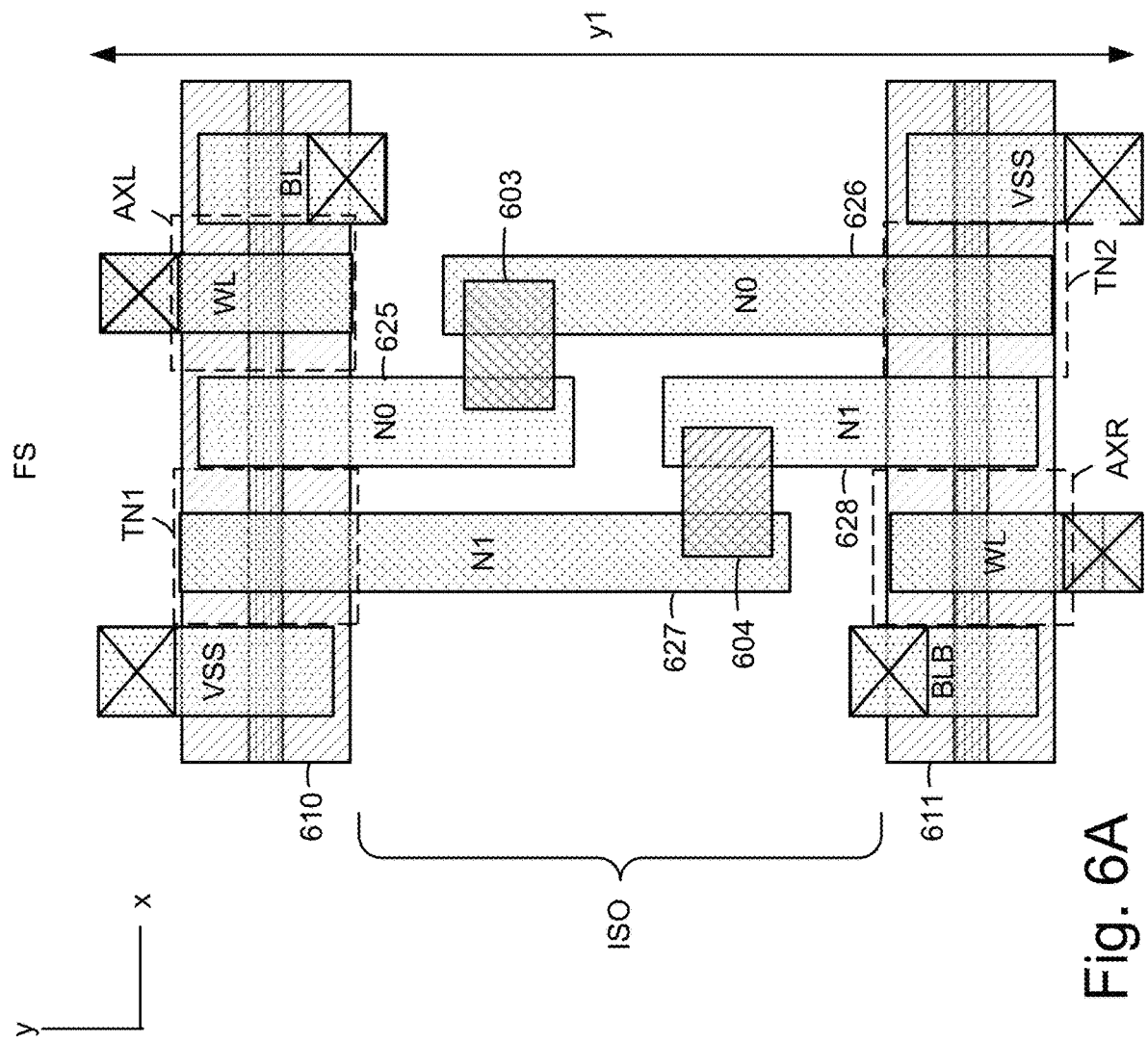
FIG. 6A depicts an example plan view of a front side (FS) of an SRAM cell, where the cell height is the same as in FIG. 5, in accordance with various embodiments.
Figure 6B:
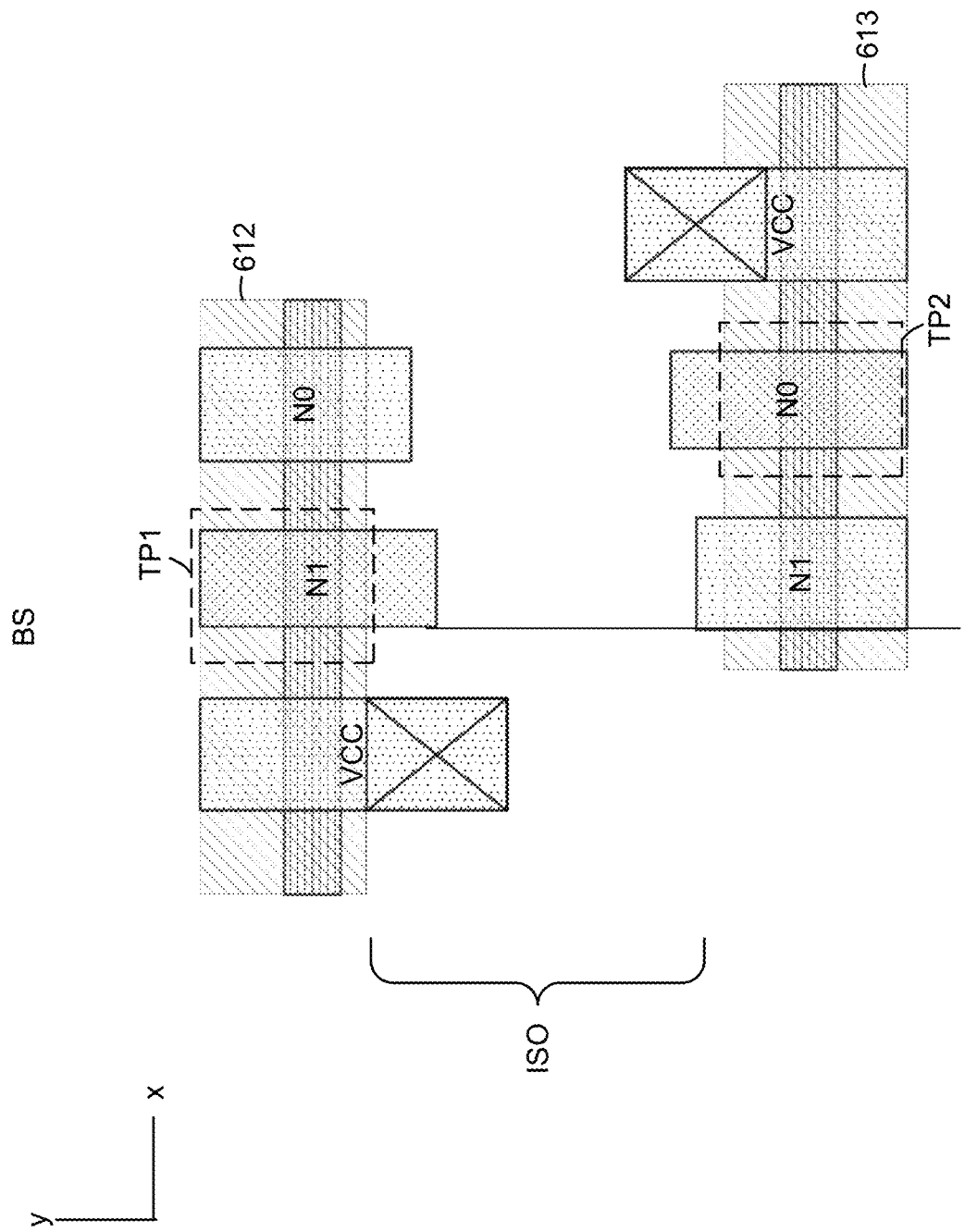
FIG. 6B depicts an example plan view of a back side (BS) of the SRAM cell of FIG. 6A in accordance with various embodiments.
Figure 6C:
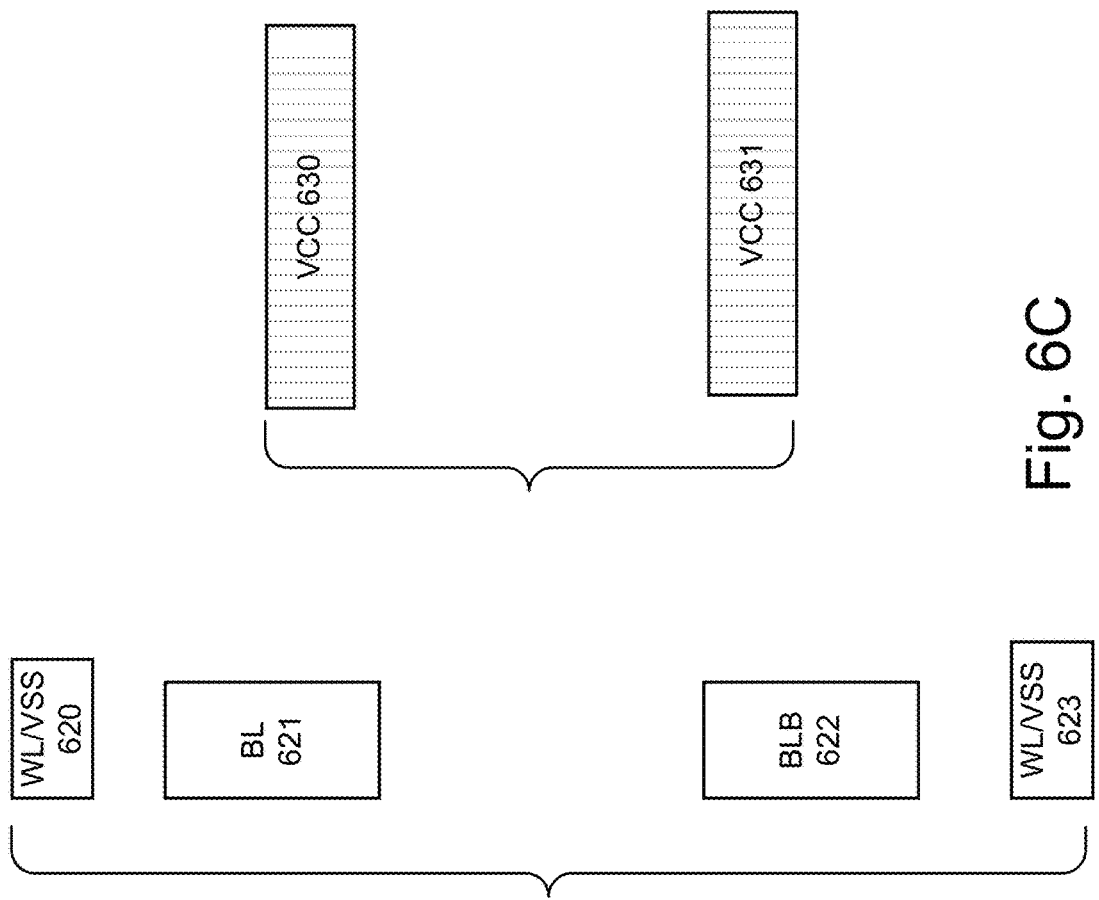
FIG. 6C depicts an example plan view of a front side metal 0 (M0) layer and a back side base metal 0 (BM0) layer of the SRAM cell of FIG. 6A in accordance with various embodiments.

FIG. 6A depicts an example plan view of a front side (FS) of an SRAM cell, where the cell height is the same as in FIG. 5, in accordance with various embodiments. In the example of FIG. 6A-6C, the SRAM uses CFET technology by scaling the transistors on the front side. This approach provides the n-type regions 610 and 611 on a top level above the p-type regions on a lower level (FIG. 6B). A GCN region 603 connects two N0 regions 625 and 626 and a GCN region 604 connects two N1 regions 627 and 628.

The nMOS transistors of the SRAM cell of FIGS. 3A and 3B are also depicted, including the transistors TN1 and AXL in the n-type region 610, and the transistors AXR and TN2 in the n-type region 611. However, this approach is not sufficient to improve the SRAM bit-cell area since the interconnect regions are not scaled.

FIG. 6B depicts an example plan view of a back side (BS) of the SRAM cell of FIG. 6A in accordance with various embodiments. The view depicts p-type regions 612 and 613 below the n-type regions of FIG. 6A. The pMOS transistors of the SRAM cell of FIGS. 3A and 3B are also depicted, including the transistor TP1 in the p-type region 620, and the transistor TP2 in the p-type region 613.

FIG. 6C depicts an example plan view of a front side metal 0 (M0) layer and a back side base metal 0 (BM0) layer of the SRAM cell of FIG. 6A in accordance with various embodiments. The M0 layer includes a WLNSS portion 620 (which share the same M0 track), a BL portion 621, a BLB portion 622 and another WL/VSS portion 623 (which share the same M0 track). The BM0 layers include portions 630 and 631 which carry a voltage VCC.

FIG. 7 depicts a table of example versions of a P-SRAM cell with CFET technology which reduces the cell area compared to FIGS. 5 and 6A-6C in accordance with various embodiments. In each of the four versions, a note indicates there is advantageously no back side GCN (BGCN). Compared to FIG. 6A-6C, Version 1 adds another metal layer, M2 for the bit lines. Additional, vias VGX and VTX are added. Version 1 uses M2 for the bit lines BL/BLB and M1 for the WL. See the example of FIG. 9A-9D. Version 2 uses BM0 to carry a signal and adds the via VGX. Version 2 uses BM0 for the bit lines BL/BLB and M1 for the WL. See the example of FIG. 10A-10C. Version 3 uses wider bit lines. It also uses BM0 to carry a signal and adds the via VGX. Version 3 uses BM0 for the bit lines BL/BLB and M1 for the WL. See the example of FIGS. 11A and 11B. Version 4 uses BM0 and BM1 to carry a signal but does not add the via VGX. Version 4 uses BM0 for the bit lines BL/BLB and BM1 for the WL. See the example of FIG. 12A-12C.

In example implementations, the P-SRAM cells are 6T cells. However, the techniques are applicable to other types of memory cells and semiconductor structures generally. The dense 6T SRAM memory cells using complementary transistors can be used in a System on a Chip (SoC), for example, to improve density, performance and power consumption. The proposed implementations provide benefits such as allowing for about 50% scaling using a minimal number of CFET process modules. For example, a BGCN is not needed, thus reducing SRAM development cost. Another benefit is the potential to maintain BL-to-BLB shielding with VCC as in a baseline cell layout (e.g., FIG. 5), despite a ~50% reduction in the cell height.

FIG. 8 depicts a table of comparisons between a SRAM cell with or without CFET technology and a P-SRAM cell with CFET technology in accordance with various embodiments. The first row indicates the area of the cell can be scaled by a factor of 0.52. The second row indicates, from a circuit perspective, the pMOS access transistors in P-SRAM require inversion of the signal of the WL driver. The third row indicates that read-assist of WL underdrive is accomplished through a slightly higher (by an amount ΔV2) WL voltage than Vss (instead of a slightly lower (by an amount ΔV1) WL voltage than VCC for the baseline cell with nMOS pass transistors). The fourth row indicates that write-assist of VCC-collapse/negative-BL/BLB(NBL) is replaced by VSS-collapse/boosting-BL/BLB.

Figure 9A:
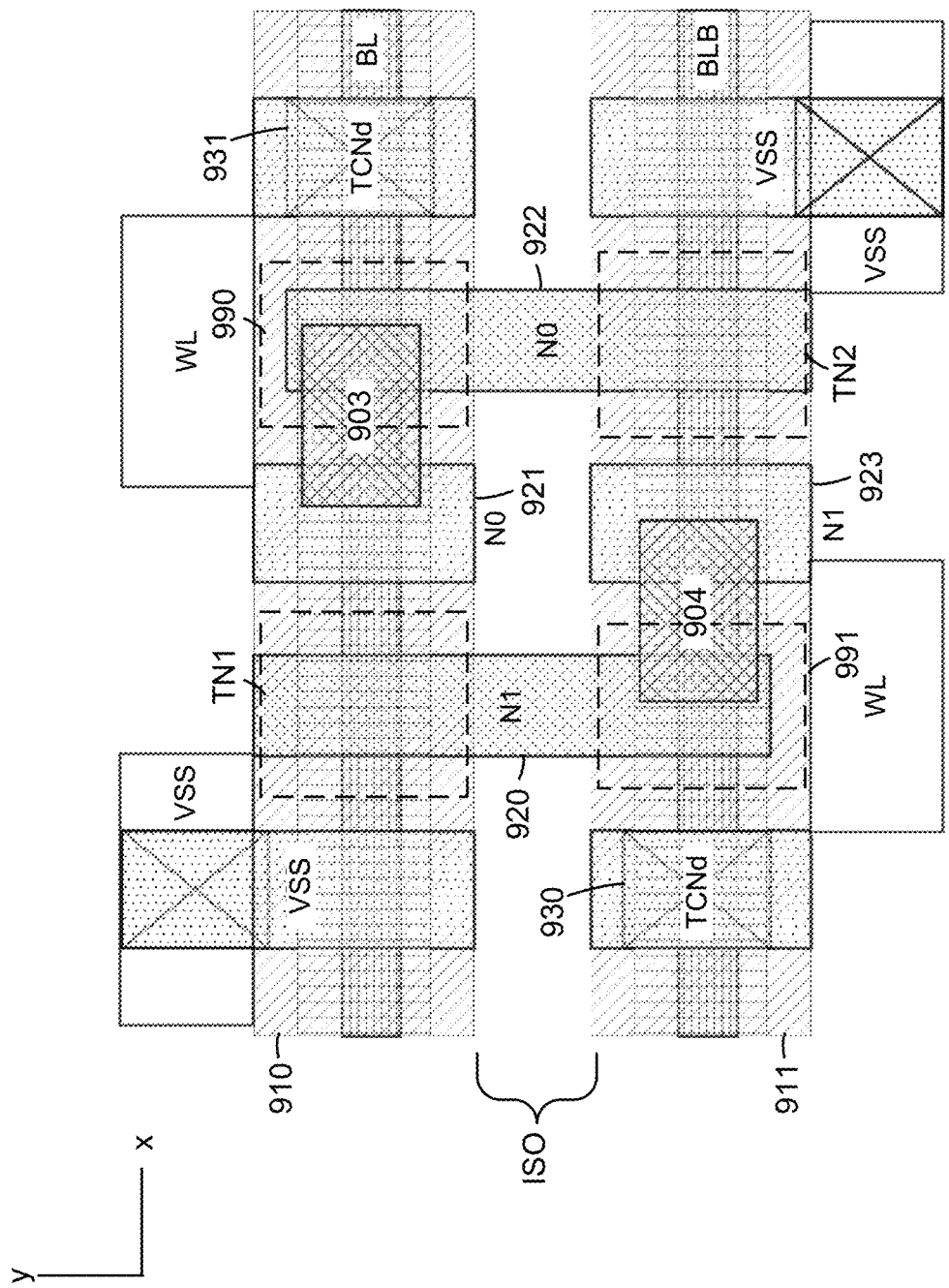
FIG. 9A depicts an example plan view of a front side of a cell consistent with Version 1 of FIG. 7, in accordance with various embodiments.

FIG. 9A depicts an example plan view of a front side of a cell consistent with Version 1 of FIG. 7, in accordance with various embodiments. The view depicts n-type regions 910 and 911. A GCN region 903 connects two N0 regions 921 and 922 and a GCN region 904 connects two N1 regions 920 and 923. TCNd denotes dummy TCN connections 930 and 931. The N1 POLY region 920 extends across both n-type regions 910 and 911 to enable connection between two N1 regions. The N0 POLY region 922 extends across both n-type regions 911 and 910 to enable connection between two N0 regions. The N0 diffusion region 921 extends only across the n-type region 910, and the N1 diffusion region 923 extends only across the n-type region 911.

The nMOS transistors of the SRAM cell of FIGS. 4A and 4B are also depicted, including the transistor TN1 in the n-type region 910, and the transistor TN2 in the n-type region 911. Scaling of the cell is enabled since a region 990 which includes and overlaps with the GCN region 903 has an overlapping footprint with the AXLp transistor of FIG. 9B, and a region 991 which includes and overlaps with the GCN region 904 has an overlapping footprint with the AXRp transistor of FIG. 9B in the underlying p-type layer 950. Scaling of the cell is also enabled since the transistors TN1 and TP1 have an overlapping footprint, and the transistors TN2 and TP2 have an overlapping footprint, referring to FIGS. 9A and 9B. Scaling of the cell is also enabled since the n-type region 910 and the p-type region 950 have an overlapping footprint, and the n-type region 911 and the p-type region 951 have an overlapping footprint. The overlap can be substantial such as at least 50%.

The footprint of a transistor or other region of the cell can represent the boundary or extent of the transistor or other region in the x-y plane, in one approach. The footprint of one transistor or other region overlaps with the footprint of another transistor or other region when their boundary or extent overlaps in the in the x-y plane.

Figure 9B:
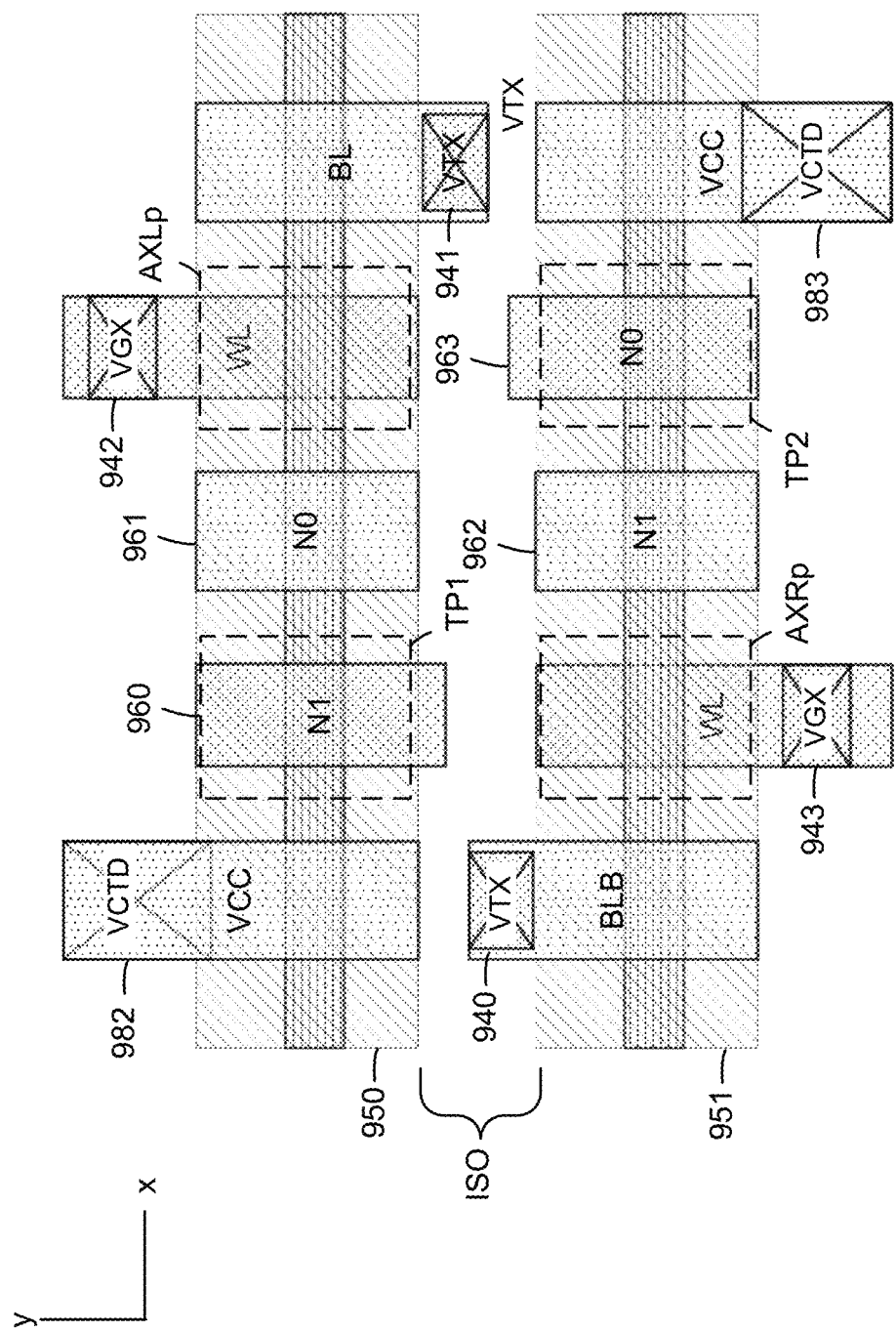
FIG. 9B depicts an example plan view of a back side of a cell consistent with Version 1 of FIG. 7, in accordance with various embodiments.

FIG. 9B depicts an example plan view of a back side of a cell consistent with Version 1 of FIG. 7, in accordance with various embodiments. The view depicts p-type regions 950 and 951. VTX denotes vias 940 and 941, and VGX denotes vias 942 and 943. The N1 POLY region 960 and N0 diffusion region 961 extend across the p-type region 950. The N1 diffusion region 962 and N0 POLY region 963 extend across the p-type region 951. However, the N0 and N1 POLY regions do not extend across both p-type regions. That is, the N0 regions 961 and 963 and the N1 regions 960 and 962 do not provide an electrical connection between the p-type regions 950 and 951. VCTD vias 982 and 983, which carry a voltage VCC, are also depicted.

The VGX connection is used for connecting a pMOS gate to a WL. The VTX connection is used for connecting a pMOS drain to BL and BLB. The VCTD connection is used for connecting a pMOS source to VCC.

An example of backside connectivity involves a M0 WL connection to a pMOS transistor using VGX, M0 connections to BL and BLB from the access transistors AXLp and AXRp using VTX, and VCC routing in the backside M0 (BM0) using VCTD. Definitions for different via layers used in CFET layouts are shown in FIG. 13A-13C.

The VTX connection for BL and BLB has an increased via resistance since it extends from a pMOS diffusion in the backside to the front side M0 through many layers in between (see FIG. 13A). To avoid the associated overhead cost, the BL and BLB can be routed in the backside M0 (BM0) as shown in FIG. 10C, 11B and 12C. In this case, the VTX via connection is replaced by a VCTD via connection which has smaller via resistance because the pMOS diffusion is directly connected to BM0. Note that the VCTD via is already in the layout for connecting VCC power to INV1 and INV2. Further, this back-side routing of BL and BLB in BM0 in FIG. 10C and 12C advantageously maintains the BL-to-BLB shielding by VCC, as in the baseline layout w/o CFET in FIG. 5, to eliminate capacitive coupling between BL and BLB during read and write operations.

The pMOS transistors of the SRAM cell of FIGS. 4A and 4B are also depicted, including the transistors TP1 and AXLp in the p-type region 950, and the transistors AXRp and TP2 in the p-type region 951.

Figure 9C:
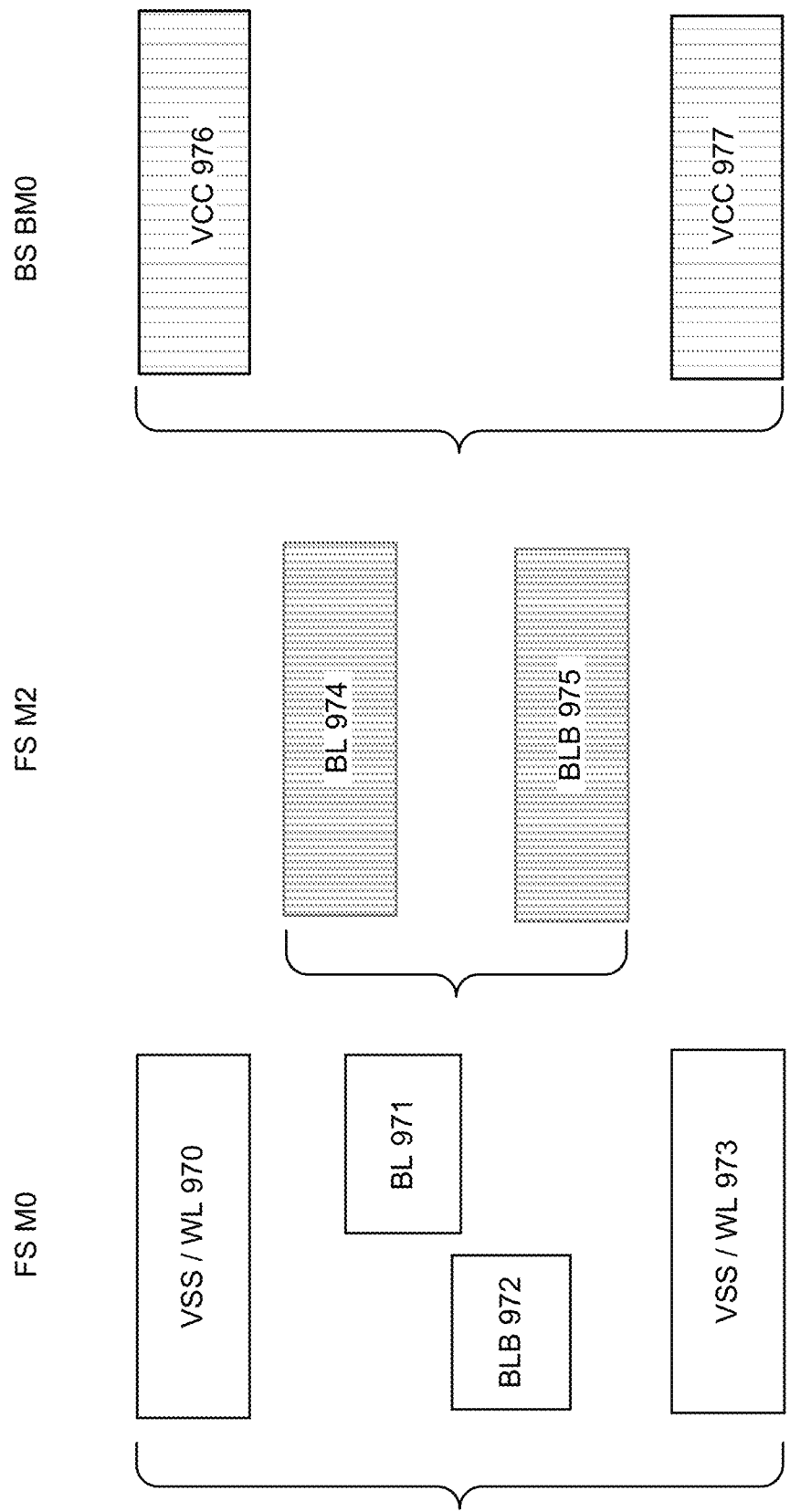
FIG. 9C depicts an example plan view of a front side M0 layer, a front side M2 layer and a back side BM0 layer of a cell consistent with Version 1 of FIG. 7, in accordance with various embodiments.

FIG. 9C depicts an example plan view of a front side M0 layer, a front side M2 layer and a back side BM0 layer of a cell consistent with Version 1 of FIG. 7, in accordance with various embodiments. The M0 layer includes four front side tracks including a Vss/WL portion 970 (a shared track), a BL portion 971, a BLB portion 972 and a Vss/WL portion 973 (another shared track). The M2 layer includes a BL portion 974 and a BLB portion 975. The BM0 layer includes VCC portions 976 and 977.

Figure 9D:
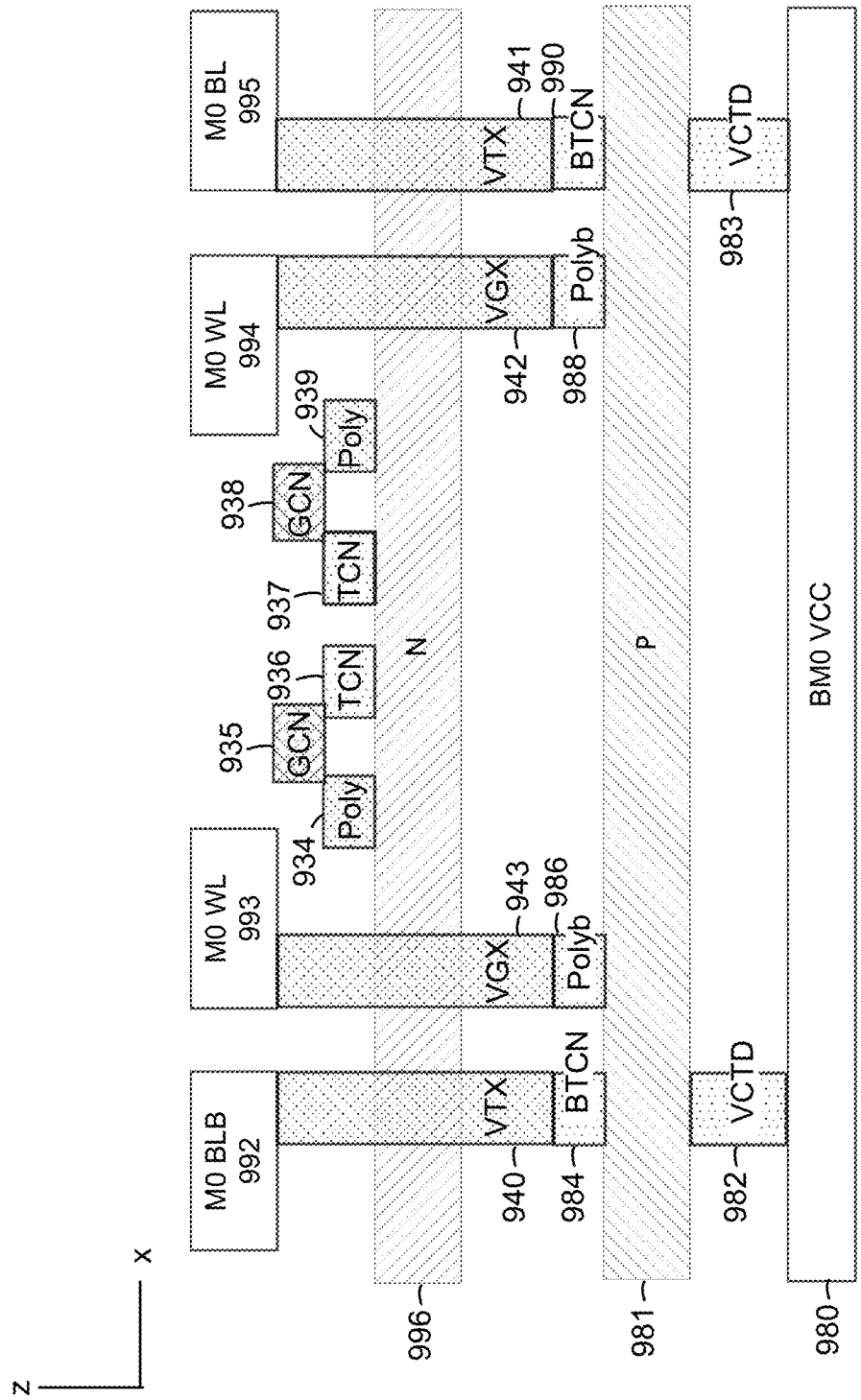
FIG. 9D depicts a simplified side view of the cell of FIG. 9A-9C in the x-z plane, in accordance with various embodiments.

FIG. 9D depicts a simplified side view of the cell of FIG. 9A-9C in the x-z plane, in accordance with various embodiments. The cell include a BM0 region 980 which is below a p-type region 981. VCTD vias 982 and 983 extend between these two regions. An n-type region 996 is above the p-type region 981. The p-type region is connected to an overlaying M0 BLB region 992 by a BTCN region 984 and the VTX via 940. The p-type region is also connected to an overlaying M0 WL region 993 by a poly region 986 and the VGX via 943. The p-type region is also connected to an overlaying M0 WL region 994 by a poly region 988 and the VGX via 942. The p-type region is also connected to an overlaying M0 BL region 995 by a BTCN region 990 and the VTX via 941.

Additionally, on the n-type region 996, a GCN region 935 is provided on a poly region 934 and a TCN region 936, and a GCN region 938 is provided on a poly region 939 and a TCN region 937.

Figure 10A:
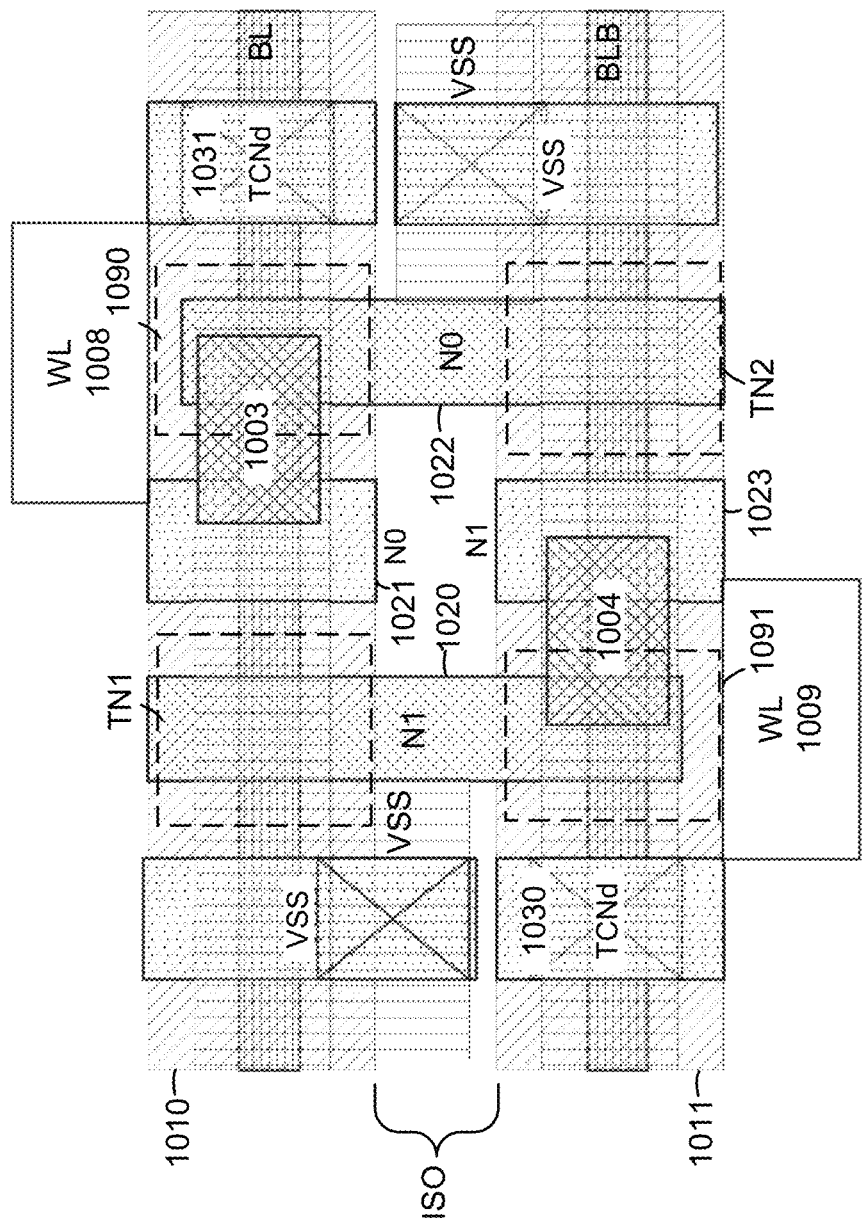
FIG. 10A depicts an example plan view of a front side of a cell consistent with Version 2 of FIG. 7, in accordance with various embodiments.

FIG. 10A depicts an example plan view of a front side of a cell consistent with Version 2 of FIG. 7, in accordance with various embodiments. The view depicts n-type regions 1010 and 1011. A GCN region 1003 connects two N0 regions 1021 and 1022 and a GCN region 1004 connects two N1 regions 1020 and 1023. TCNd denotes dummy TCN connections 1030 and 1031. The N1 region 1020 and N0 region 1022 extend across both n-type regions 1010 and 1011, and provide an electrical connection between the n-type regions. The N0 region 1021 extends only across the n-type region 1010, and the N1 region 1023 extends only across the n-type region 1011. These N0 and N1 regions 1021 and 1023, respectively, do not provide an electrical connection between the n-type regions. The view further includes WL portions 1008 and 1009.

The nMOS transistors of the SRAM cell of FIGS. 4A and 4B are also depicted, including the transistor TN1 in the n-type region 1010, and the transistor TN2 in the n-type region 1011. Scaling of the cell is enabled since a region 1090 which includes and overlaps with the GCN region 1003 has an overlapping footprint with the AXLp transistor of FIG. 10B, and a region 1091 which includes and overlaps with the GCN region 1004 has an overlapping footprint with the AXRp transistor of FIG. 9B. Scaling of the cell is also enabled since the transistors TN1 and TP1 have an overlapping footprint, and the transistors TN2 and TP2 have an overlapping footprint, referring to FIGS. 10A and 10B. Scaling of the cell is also enabled since the n-type region 1010 and the p-type region 1050 have an overlapping footprint, and the n-type region 1011 and the p-type region 1051 have an overlapping footprint.

Figure 10B:
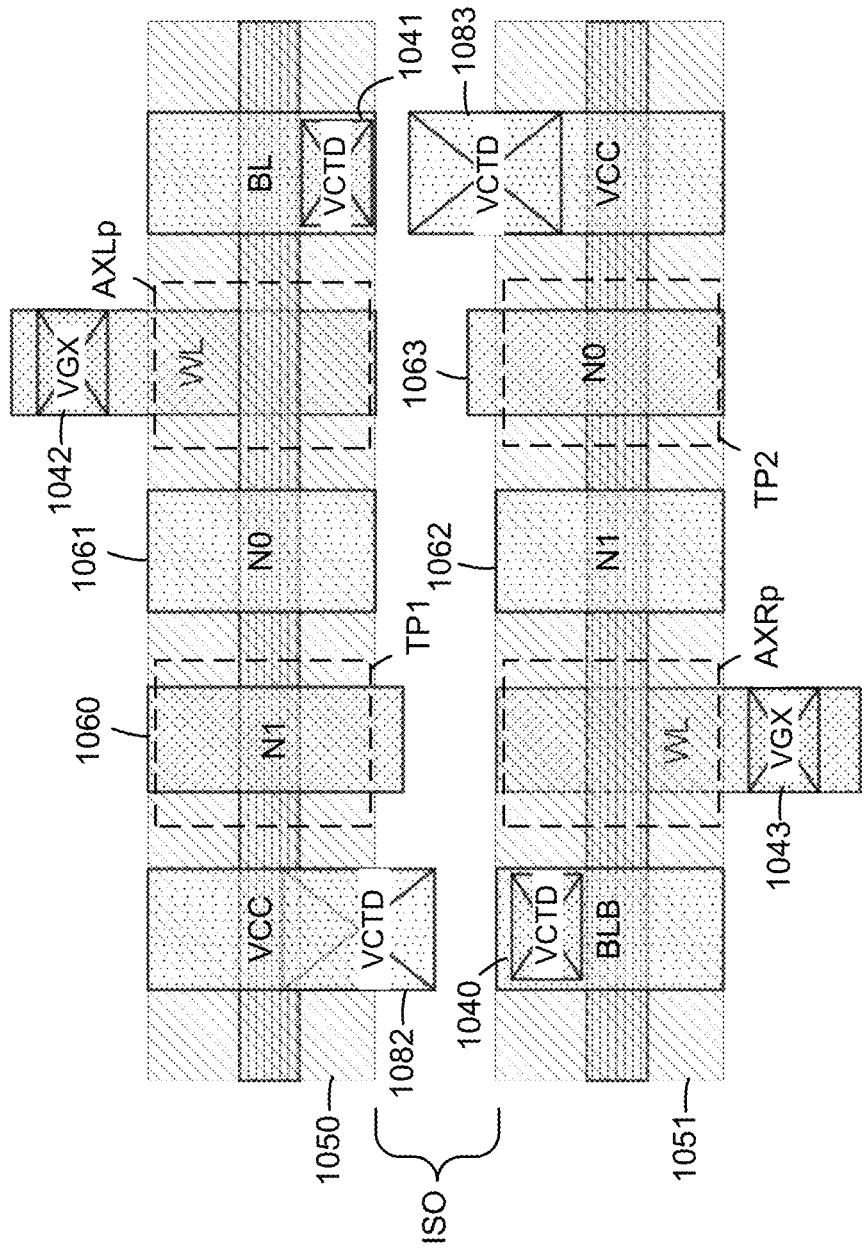
FIG. 10B depicts an example plan view of a back side of a cell consistent with Version 2 of FIG. 7, in accordance with various embodiments.
Figure 10C:
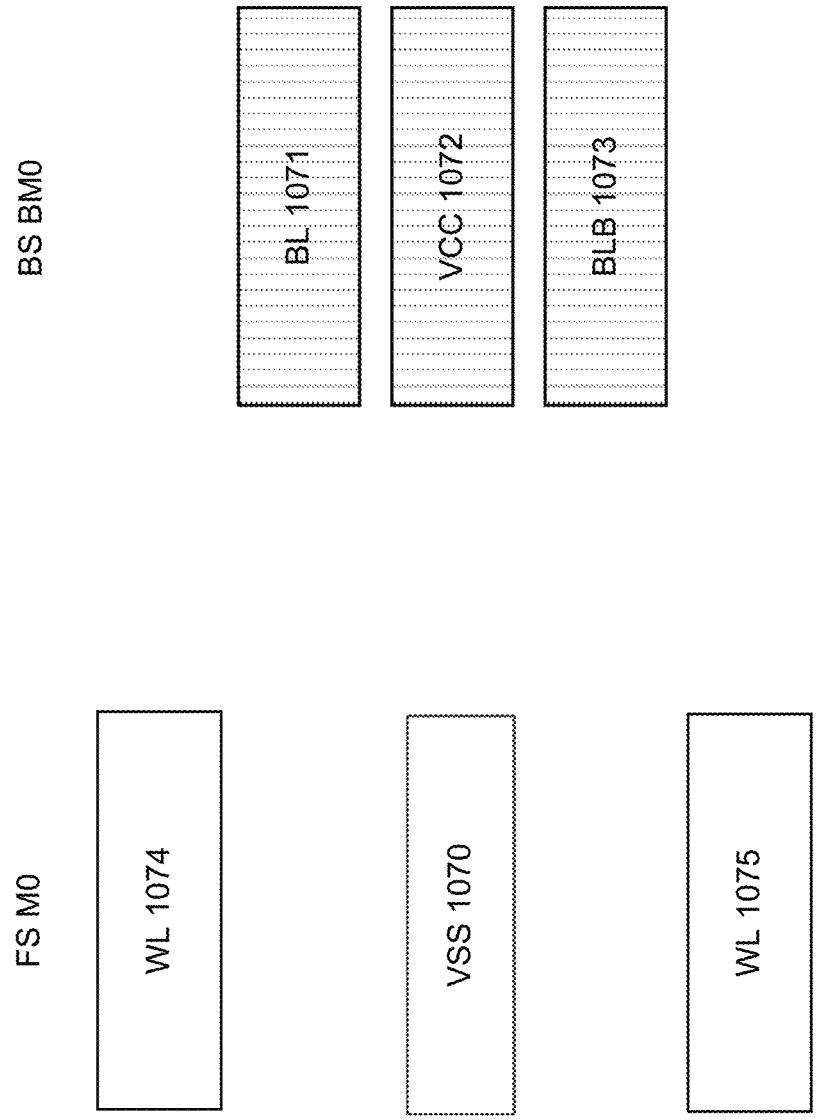
FIG. 10C depicts an example plan view of a front side M0 layer and a back side BM0 layer of a cell consistent with Version 2 of FIG. 7, in accordance with various embodiments.

FIG. 10B depicts an example plan view of a back side of a cell consistent with Version 2 of FIG. 7, in accordance with various embodiments. The view depicts p-type regions 1050 and 1051. VCTD denotes vias 1040, 1041, 1082 and 1083 and VGX denotes vias 1042 and 1043. The N1 region 1060 and N0 region 1061 extend across the p-type region 1050. The N1 region 1062 and N0 region 1063 extend across the p-type region 1051. However, the N0 and N1 regions do not extend across both p-type regions. That is, the N0 regions 1061 and 1063 and the N1 regions 1060 and 1062 do not provide an electrical connection between the p-type regions 1050 and 1051.

The pMOS transistors of the P-SRAM cell of FIGS. 4A and 4B are also depicted, including the transistors TP1 and AXLp in the p-type region 1050, and the transistors AXRp and TP2 in the p-type region 1051.

FIG. 10C depicts an example plan view of a front side M0 layer and a back side BM0 layer of a cell consistent with Version 2 of FIG. 7, in accordance with various embodiments. The M0 layer includes a Vss portion 1070 between WL portions 1074 and 1075. The BM0 layer includes a BL portion 1071, a VCC portion 1072 and a BLB portion 1073.

Three metal tracks are used in the front side and three metal tracks are used in the backside. BL and BLB are in close proximity with VCC shielding, thus achieving lower capacitive coupling between BL and BLB.

For Version 3, the plan view of the front side of the cell can be the same as in FIG. 10A.

Figure 11A:
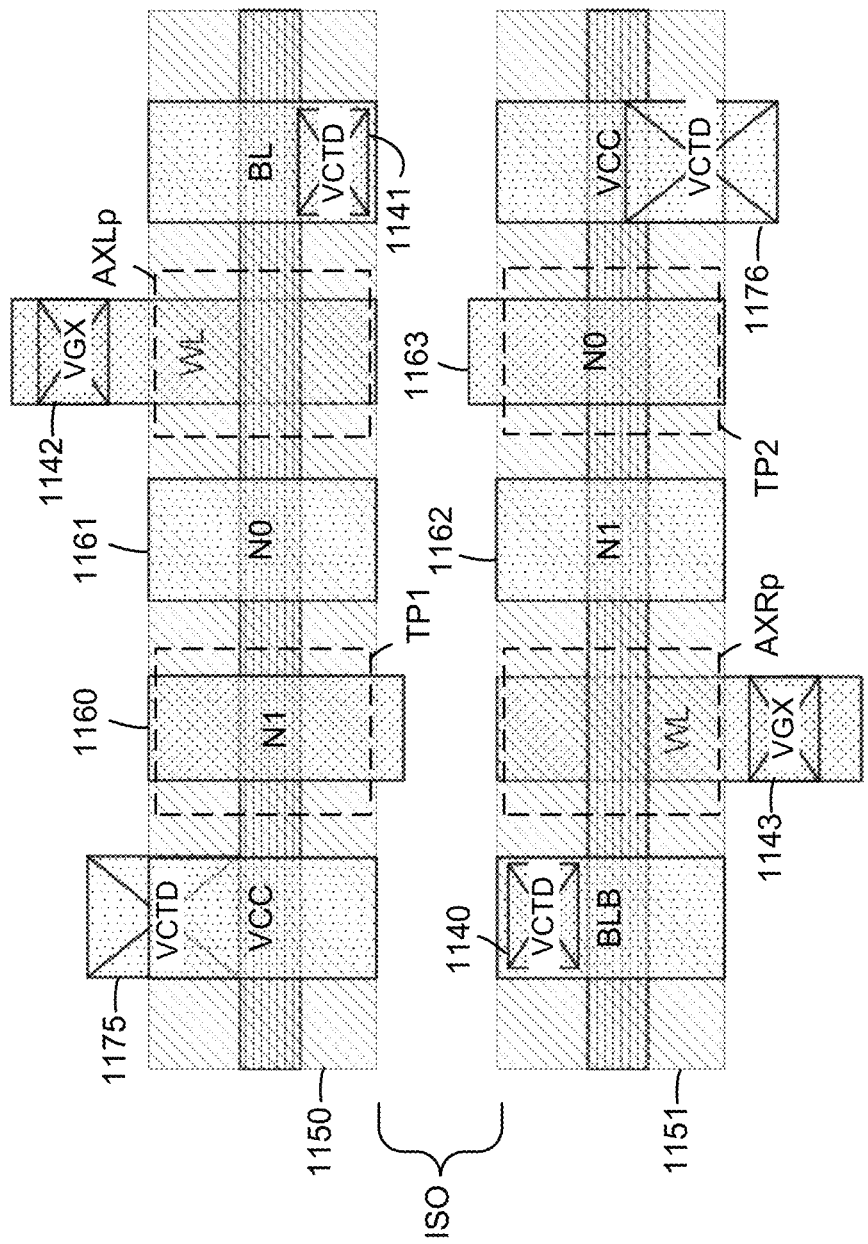
FIG. 11A depicts an example plan view of a back side of a cell consistent with Version 3 of FIG. 7, in accordance with various embodiments.
Figure 11B:
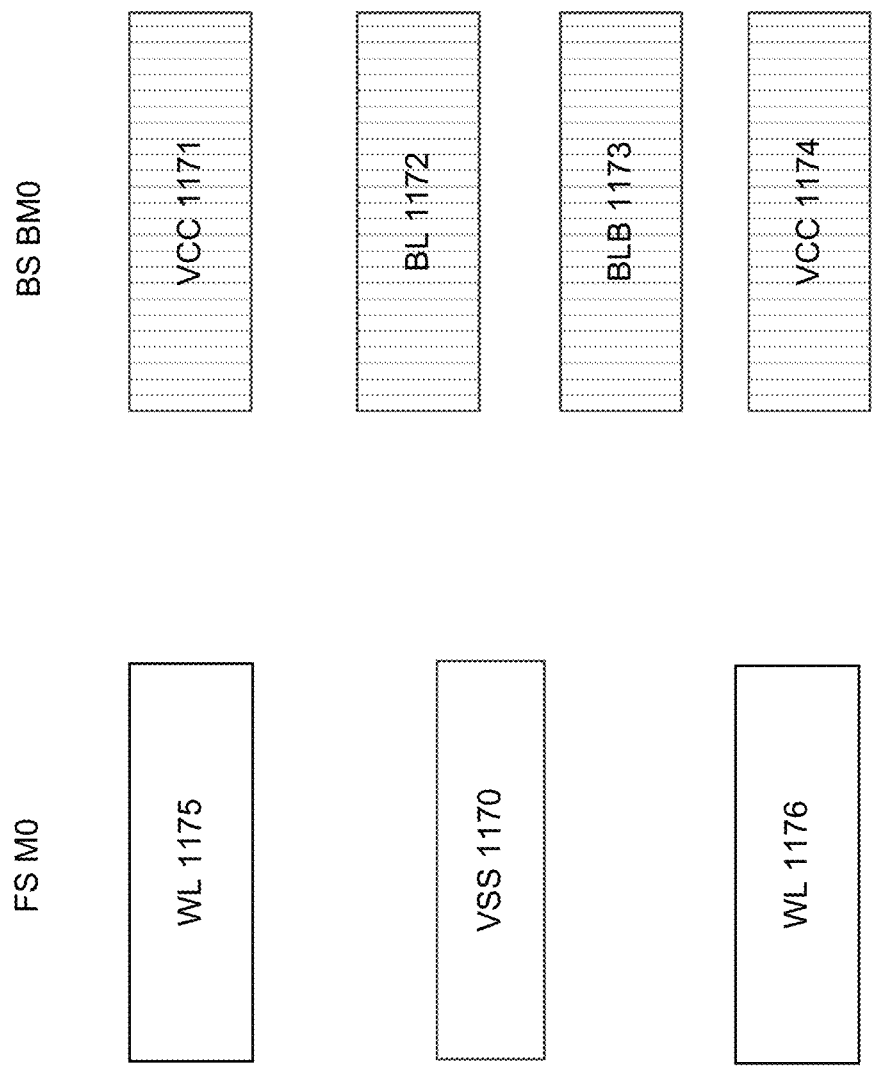
FIG. 11B depicts an example plan view of a front side M0 layer and a back side BM0 layer of a cell consistent with Version 3 of FIG. 7, in accordance with various embodiments.

FIG. 11A depicts an example plan view of a back side of a cell consistent with Version 3 of FIG. 7, in accordance with various embodiments. The view depicts p-type regions 1150 and 1151. VCTD denotes vias 1140, 1141, 1175 and 1176, and VGX denotes vias 1142 and 1143. The N1 region 1160 and N0 region 1161 extend across the p-type region 1150. The N1 region 1162 and N0 region 1163 extend across the p-type region 1151. However, the N0 and N1 regions do not extend across both p-type regions. That is, the N0 regions 1161 and 1163 and the N1 regions 1160 and 1162 do not provide an electrical connection between the p-type regions 1150 and 1151. Compared to FIG. 10B, the VCTD vias, which are connected to VCC, are located differently.

The pMOS transistors of the SRAM cell of FIGS. 4A and 4B are also depicted, including the transistors TP1 and AXLp in the p-type region 1150, and the transistors AXRp and TP2 in the p-type region 1051. Scaling of the cell is also enabled since the transistors TN1 and TP1 have an overlapping footprint, and the transistors TN2 and TP2 have an overlapping footprint, referring to FIGS. 10A and 11A. Scaling of the cell is also enabled since the n-type region 1010 and the p-type region 1150 have an overlapping footprint, and the n-type region 1011 and the p-type region 1151 have an overlapping footprint.

FIG. 11B depicts an example plan view of a front side M0 layer and a back side BM0 layer of a cell consistent with Version 3 of FIG. 7, in accordance with various embodiments. In this first option for the metal layers, the M0 layer includes a Vss portion 1170 between WL portions 1175 and 1176. The BM0 layer includes a VCC portion 1171, a BL portion 1172, a BLB portion 1173 and a VCC portion 1174.

Three metal tracks are used in the front side and four metal tracks are used in the backside. BL and BLB are in close proximity without VCC shielding.

Figure 12A:
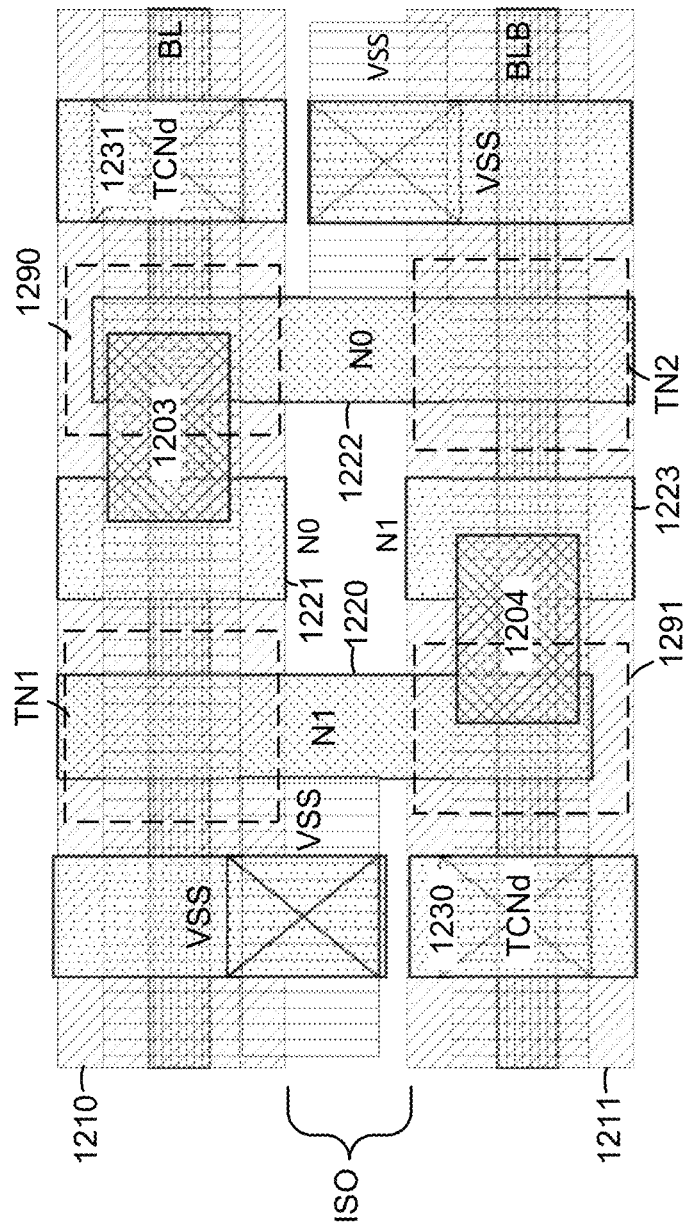
FIG. 12A depicts an example plan view of a front side of a cell consistent with Version 4 of FIG. 7, in accordance with various embodiments.

FIG. 12A depicts an example plan view of a front side of a cell consistent with Version 4 of FIG. 7, in accordance with various embodiments. The plan view of the front side of the cell is the same as in FIG. 10A except the WL portions 1008 and 1009 are not used.

The view depicts n-type regions 1210 and 1211. A GCN region 1203 connects two N0 regions 1221 and 1222 and a GCN region 1204 connects two N1 regions 1220 and 1223. TCNd denotes dummy TCN connections 1230 and 1231. The N1 region 1220 and N0 region 1222 extend across both n-type regions 1210 and 1211, and provide an electrical connection between the n-type regions. The N0 region 1221 extends only across the n-type region 1210, and the N1 region 1223 extends only across the n-type region 1211. These N0 and N1 regions 1221 and 1223, respectively, do not provide an electrical connection between the n-type regions.

The nMOS transistors of the SRAM cell of FIGS. 4A and 4B are also depicted, including the transistor TN1 in the n-type region 1210, and the transistor TN2 in the n-type region 1211. Scaling of the cell is enabled since a region 1290 which includes and overlaps with the GCN region 1203 has an overlapping footprint with the AXLp transistor of FIG. 12B, and a region 1291 which includes and overlaps with the GCN region 1204 has an overlapping footprint with the AXRp transistor of FIG. 12B. Scaling of the cell is also enabled since the transistors TN1 and TP1 have an overlapping footprint, and the transistors TN2 and TP2 have an overlapping footprint, referring to FIGS. 12A and 12B. Scaling of the cell is also enabled since the n-type region 1210 and the p-type region 1250 have an overlapping footprint, and the n-type region 1211 and the p-type region 1251 have an overlapping footprint.

Figure 12B:
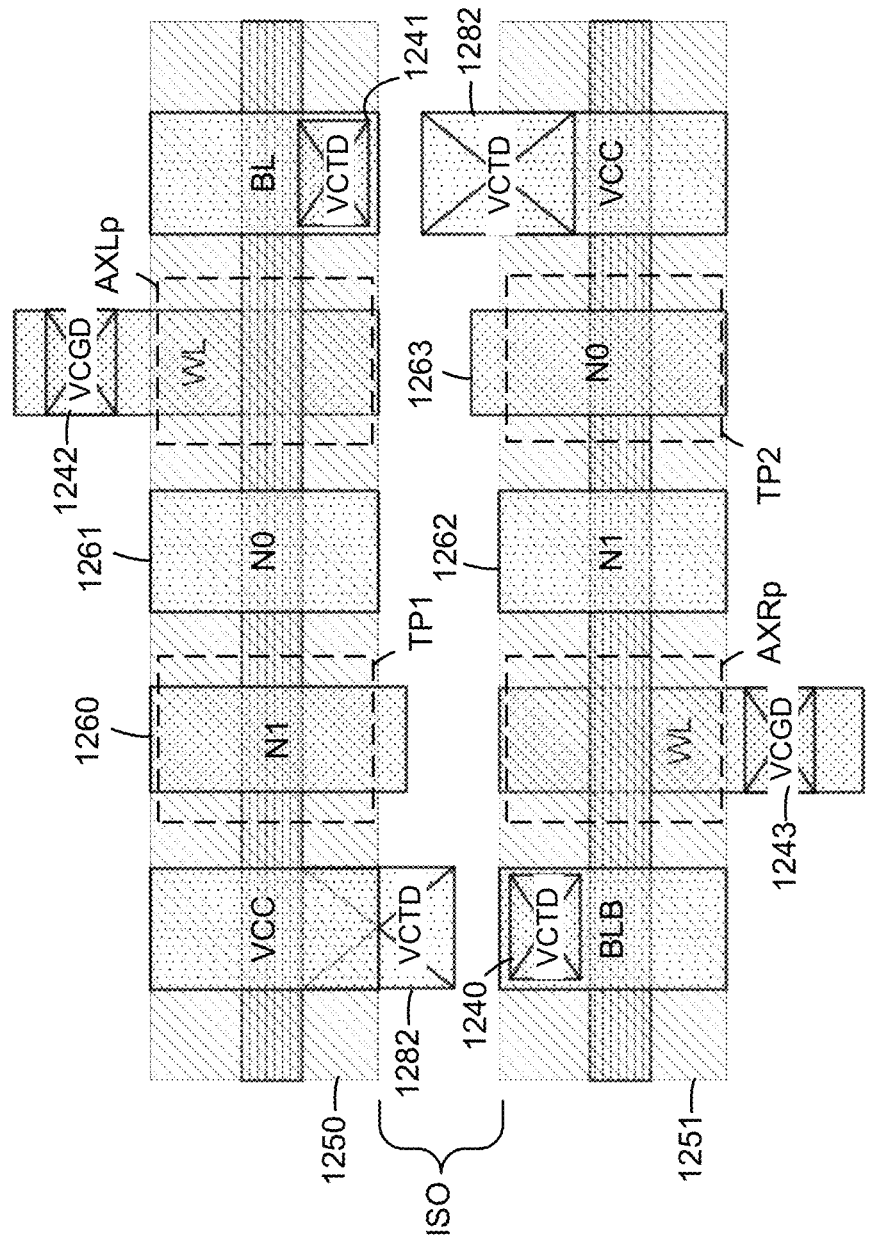
FIG. 12B depicts an example plan view of a back side of a cell consistent with Version 4 of FIG. 7, in accordance with various embodiments.

FIG. 12B depicts an example plan view of a back side of a cell consistent with Version 4 of FIG. 7, in accordance with various embodiments. This view is the same as FIG. 10B except the VGX vias 1042 and 1043 are replaced by the VCGD vias 1242 and 1243, respectively. The view depicts p-type regions 1250 and 1251. VCTD denotes vias 1240, 1241, 1282 and 1283, and VCGD denotes vias 1242 and 1243. The N1 region 1260 and N0 region 1261 extend across the p-type region 1250. The N1 region 1262 and N0 region 1263 extend across the p-type region 1251. However, the N0 and N1 regions do not extend across both p-type regions. That is, the N0 regions 1261 and 1263 and the N1 regions 1260 and 1262 do not provide an electrical connection between the p-type regions 1250 and 1251.

The pMOS transistors of the SRAM cell of FIGS. 4A and 4B are also depicted, including the transistors TP1 and AXLp in the p-type region 1250, and the transistors AXRp and TP2 in the p-type region 1251.

FIG. 12C depicts an example plan view of a front side M0 layer and a back side BM0 layer of a cell consistent with Version 4 of FIG. 7, in accordance with various embodiments. The M0 layer includes a Vss portion 1270. The BM0 layer includes a WL portion 1271, a BL portion 1272, a VCC portion 1273, a BLB portion 1274 and a WL portion 1275. One metal track is used in the front side and five metal tracks are used in the backside. BL and BLB are in close proximity with VCC shielding.

FIG. 13A depicts an example perspective view of different layers and vias that are supported in CFET technology, in accordance with various embodiments. FIG. 13A-13C depict various connections and naming conventions to assist in understanding of the other figures, including those for Versions 1-4. The structure 1300 includes a bottom metal layer, BM1, as a bottommost or first layer. A bottom metal zero layer, BM0, is a second layer connected to BM1 by a via VOB. A next higher layer includes btcn and Polyb which are connected to the underlying BM0 by vias Vctd and Vcgd, respectively. This layer also includes Polyb and btcn which are connected to an overlaying metal zero layer, M0, by vias Vgx and Vtx, respectively. Use of a shorter via to connect to a metal layer is preferable to reduce capacitance and complexity. The closest metal layer may be below or above in different cases. A next higher layer includes tcn and Poly which are connected to btcn and Polyb by vias Vctb and Vcgb, respectively. M0 is the next higher layer. M0 is connected to tcn and Poly by vias Vct and Vcg, respectively. A next higher layer above M0 is a metal one layer, M1. M1 is connected to M0 by a via V0. A next higher layer is a metal two layer, M2. M2 is connected to M1 by a via V1.

FIG. 13B depicts an example view of an nMOS transistor 1350 and pMOS transistor 1360 consistent with FIG. 13A, and in accordance with various embodiments. The nMOS includes an active area 1351 with regions 1352-1354 and the pMOS includes an active area 1361 with regions 1362-1364.

FIG. 13C depicts an example view of a first structure 1370 and a second structure 1380 consistent with FIG. 13A, and in accordance with various embodiments. An intermediate structure gcn is used to connect structures 1371 (tcn) and 1372 (poly) which extend horizontally in the x-y plane.

Similarly, an intermediate structure bgcn is used to connect structures 1381 (btcn) and 1382 (polyb) which extend horizontally in the x-y plane.

Figure 14A:
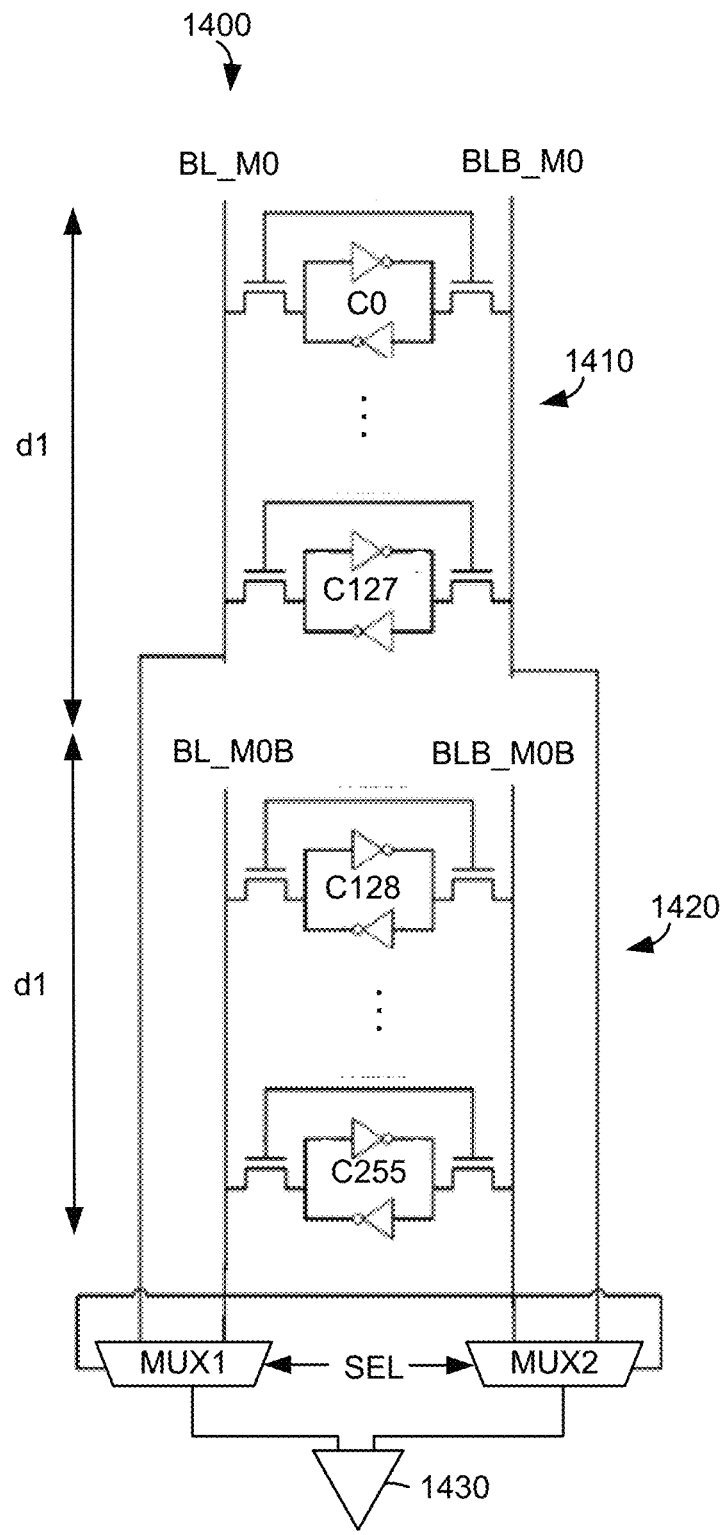
FIG. 14A depicts an example column of memory cells in which one-half of the memory cells are connected to BL_M0 and BLB_M0 on metal layer M0, and one-half of the memory cells are connected to BL_M0B and BLB_M0B on metal layer BM0, in accordance with various embodiments.

FIG. 14A depicts an example column of memory cells in which one-half of the memory cells are connected to BL_M0 and BLB_M0 on metal layer M0, and another one-half of the memory cells are connected to BL_M0B and BLB_M0B on metal layer BM0, in accordance with various embodiments. Bit-cell scaling as described earlier is one way to improve the SRAM density. Another technique to improve the density of SRAM is to effectively pack more bits per SRAM array, thus amortizing the area cost of decoder, timer and I/O circuits in the SRAM. By enabling more bits per WL and more bits per BL, the SRAM density can be further improved. However, the interconnect resistance and capacitance associated with longer WLs and BLs results in an upper limit to the number of bits that can be accommodated on the WL and BL. This limits the efficiency of the SRAM to about 75%. However, the availability of additional metal resources such as back-side M0 (BM0) offers opportunities to accommodate more bits per BL as described below.

In this example, one pair of bit lines in a column, BL and BLB, is shared by 256 bits/cells. The BLs are routed using M0 and each bit contributes to the capacitance of the BLs. A higher BL capacitance results in larger power consumption for read and write operations since the BL needs to discharge partially or completely during read and write operations, respectively. With the availability of BM0 in addition to M0, it is possible to, e.g., route 128 cells using M0 and the remaining 128 cells using BM0 as shown in FIG. 14A. For example, a first set of cells 1410 comprises cells C0-C127 and a second set of cells 1420 comprises cells C128-C255. The first set of cells is coupled to bit lines BL_M0 and BLB_M0, which have a length d1+d1. The second set of cells is coupled to bit lines BL_M0B and BLB_M0B, which have a length d1. The BLs are selected through first and second multiplexers (MUX1 and MUX2, respectively) based on the address, and then routed to a sense amplifier 1430. For example, when a cell is selected in the first set of cells, MUX1 selects BL_M0 and MUX2 selects BLB_M0. When a cell is selected in the second set of cells, MUX1 selects BL_M0B and MUX2 selects BLB_M0B. The multiplexers can receive a common select signal, SEL.

The BLs which are routed through BM0 have their capacitance reduced by one-half since their length is d1 instead of d1+d1, and since the number of access devices is reduced by one-half. The BLs routed using M0 have one-half the load from junction/diffusion capacitance. However, the interconnect distance has not decreased since the sense amplifier is farther away than for the BLs routed using BM0. Based on an analysis, the interconnect capacitance is the dominating component of capacitance (~70%) and hence the total BL capacitance 0.7+0.3/2~0.85. One way to utilize the lower BL capacitance is to improve the read and write power dissipation since the BL pre-charge component is a significant component of power dissipation.

Figure 14B:
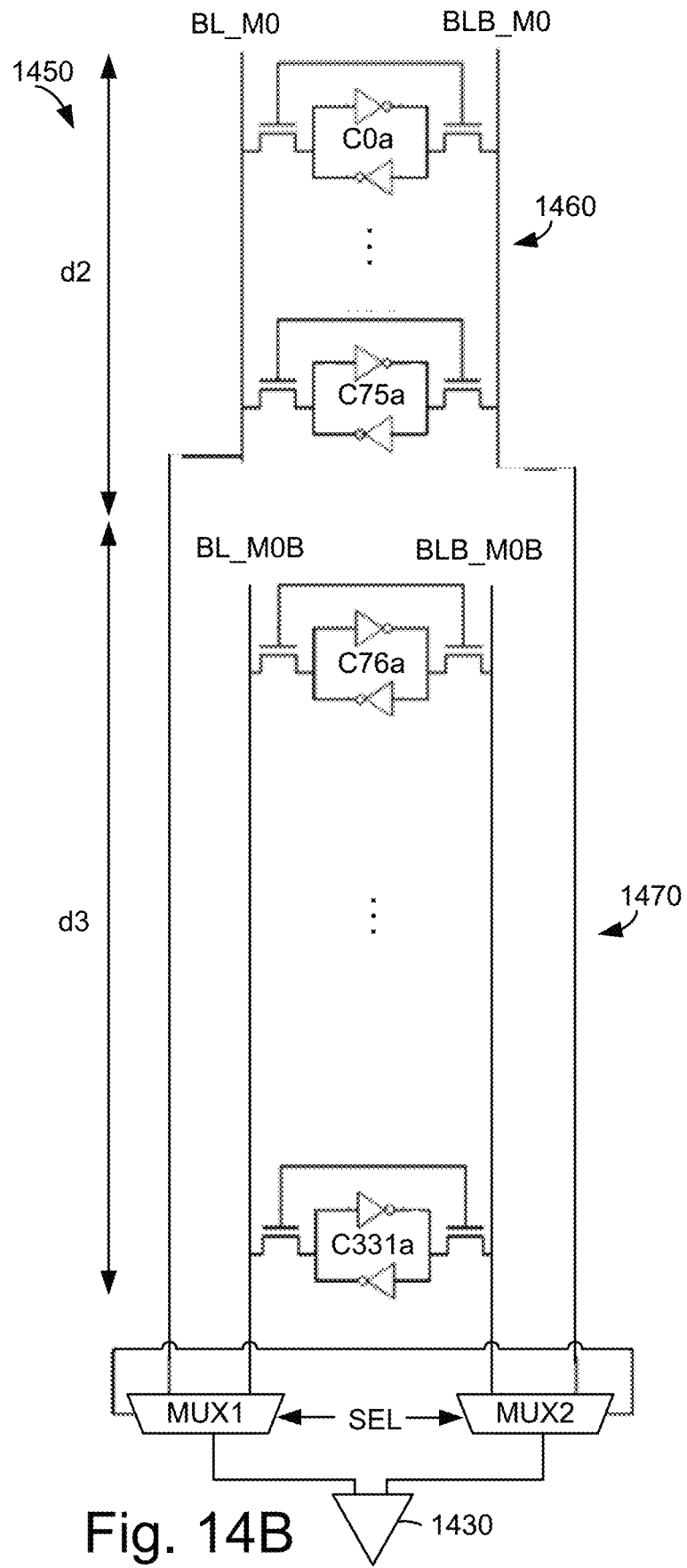
FIG. 14B depicts an example column of memory cells in which one-fourth of the memory cells are connected to BL_M0 and BLB_M0 on metal layer M0, and three-fourths of the memory cells are connected to BL_M0B and BLB_M0B on metal layer BM0, in accordance with various embodiments.

FIG. 14B depicts an example column of memory cells in which one-fourth of the memory cells are connected to BL_M0 and BLB_M0 on metal layer M0, and three-fourths of the memory cells are connected to BL_M0B and BLB_M0B on metal layer BM0, in accordance with various embodiments. An alternate approach is to use the lowered capacitance to accommodate more cells in the BLs routed using BM0 compared to the number of cells in the BLs routed using M0. For example, the BM0 cells can be increased from 128 to 256. The number of M0 cells decreases from 128 to 76 due to the additional interconnect component added by doubling of cells routed using BM0. Hence, in total the number of cells in the column 1450 increases from 256 to 332. This increases the memory density efficiency from 75% to 80% which in turn can be used to increase the SRAM capacity.

For example, a first set of cells 1460 comprises cells C0a-C75a and a second set of cells 1470 comprises cells C76a-C331a. The first set of cells is coupled to BL_M0 and BLB_M0 which have a length d2+d3. The second set of cells is coupled to BL_M0B and BLB_M0B which have a length d3. As in FIG. 14A, for the first set of cells, MUX1 selects BL_M0 and MUX2 selects BLB_M0. For the second set of cells, MUX1 selects BL_M0B and MUX2 selects BLB_M0B. A distance between the first set of cells and the sense amplifier is greater than a distance between the second set of cells and the sense amplifier. This distance can be minimum, average or maximum distance, for example.

Generally, the number of cells in the second set is greater than the number of cells in the first set. For example, the number of cells in the second set can greater than the number of cells in the first set by at least a factor of 1.5 or 2. In this example, the number of cells in the second set is greater than the number of cells in the first set by a factor of three. Also, the number of cells was increased from 256 to 332 compared to FIG. 14A, with 76 cells in the first set and 256 cells in the second set. In another example, the number of cells remains the same but the proportion of cells in the first and second sets is different. For example, there could be 64 cells in the first set and 192 cells in the second set for a 3:1 ratio.

In another example, the larger, second set of cells is coupled to the M0 BLs and the smaller, first set of cells is coupled to the BM0 BLs.

The proposed P-SRAM enables both M0 BLs using VTX and BM0 BLs using Vctd as described previously. Both SRAM cell layouts can be drawn in the same foot-print and hence it enables M0 and BM0 BL routing without any area overhead.

Figure 15:
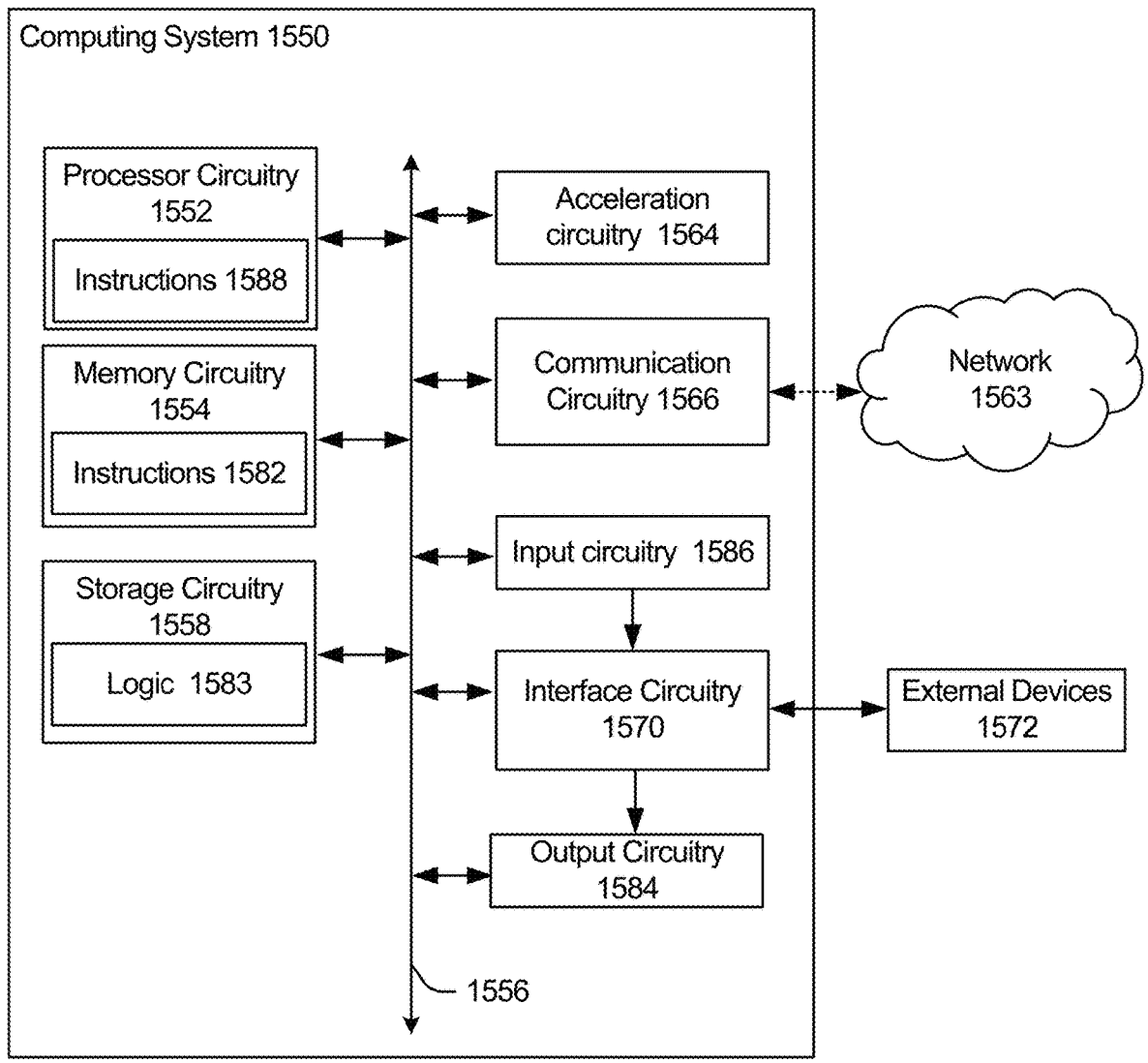
FIG. 15 illustrates an example of components that may be present in a computing system 1550 for implementing the techniques (e.g., operations, processes, methods, and methodologies) described herein.

FIG. 15 illustrates an example of components that may be present in a computing system 1550 for implementing the techniques (e.g., operations, processes, methods, and methodologies) described herein. The computing system 1550 may include any combinations of the hardware or logical components referenced herein. The components may be implemented as ICs, portions thereof, discrete electronic devices, or other modules, instruction sets, programmable logic or algorithms, hardware, hardware accelerators, software, firmware, or a combination thereof adapted in the computing system 1550, or as components otherwise incorporated within a chassis of a larger system. For one embodiment, at least one processor 1552 may be packaged together with computational logic 1582 and configured to practice aspects of various example embodiments described herein to form a System in Package (SiP) or a System on Chip (SoC).

The system 1550 includes processor circuitry in the form of one or more processors 1552. The processor circuitry 1552 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1552 may include one or more hardware accelerators (e.g., same or similar to acceleration circuitry 1564), which may be microprocessors, programmable processing devices (e.g., FPGA, ASIC, etc.), or the like. The one or more accelerators may include, for example, computer vision and/or deep learning accelerators. In some implementations, the processor circuitry 1552 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 1552 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 1552 may be coupled with or may include memory/storage and may be configured to execute instructions stored in the memory/storage to enable various applications or operating systems to run on the platform 1550. The processors (or cores) 1552 is configured to operate application software to provide a specific service to a user of the platform 1550. In some embodiments, the processor(s) 1552 may be a special-purpose processor(s)/controller(s) configured (or configurable) to operate according to the various embodiments herein.

As examples, the processor(s) 1552 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1552 may be a part of a system on a chip (SoC), System-in-Package (SiP), a multi-chip package (MCP), and/or the like, in which the processor(s) 1552 and other components are formed into a single integrated circuit, or a single package, such as the Edison™ or Galileo™ SoC boards from Intel® Corporation. Other examples of the processor(s) 1552 are mentioned elsewhere in the present disclosure.

The system 1550 may include or be coupled to acceleration circuitry 1564, which may be embodied by one or more AI/ML accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as complex (CPLDs) or high complexity PLDs (HCPLDs), and/or other forms of specialized processors or circuitry designed to accomplish one or more specialized tasks. These tasks may include AI/ML processing (e.g., including training, inferencing, and classification operations), visual data processing, network data processing, object detection, rule analysis, or the like. In FPGA-based implementations, the acceleration circuitry 1564 may comprise logic blocks or logic fabric and other interconnected resources that may be programmed (configured) to perform various functions, such as the procedures, methods, functions, etc. of the various embodiments discussed herein. In such implementations, the acceleration circuitry 1564 may also include memory cells (e.g., EPROM, EEPROM, flash memory, static memory (e.g., SRAM, anti-fuses, etc.) used to store logic blocks, logic fabric, data, etc. in LUTs and the like.

In some implementations, the processor circuitry 1552 and/or acceleration circuitry 1564 may include hardware elements specifically tailored for machine learning and/or artificial intelligence (AI) functionality. In these implementations, the processor circuitry 1552 and/or acceleration circuitry 1564 may be, or may include, an AI engine chip that can run many different kinds of AI instruction sets once loaded with the appropriate weightings and training code. Additionally or alternatively, the processor circuitry 1552 and/or acceleration circuitry 1564 may be, or may include, AI accelerator(s), which may be one or more of the aforementioned hardware accelerators designed for hardware acceleration of AI applications. As examples, these processor(s) or accelerators may be a cluster of artificial intelligence (AI) GPUs, tensor processing units (TPUs) developed by Google® Inc., Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the processor circuitry 1552 and/or acceleration circuitry 1564 and/or hardware accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like. In some hardware-based implementations, individual subsystems of system 1550 may be operated by the respective AI accelerating co-processor(s), AI GPUs, TPUs, or hardware accelerators (e.g., FPGAs, ASICs, DSPs, SoCs, etc.), etc., that are configured with appropriate logic blocks, bit stream(s), etc. to perform their respective functions.

The system 1550 also includes system memory 1554. Any number of memory devices may be used to provide for a given amount of system memory. As examples, the memory 1554 may be, or include, volatile memory such as random access memory (RAM), static RAM (SRAM), dynamic RAM (DRAM), synchronous DRAM (SDRAM), RAM-BUS® Dynamic Random Access Memory (RDRAM®), and/or any other desired type of volatile memory device. Additionally or alternatively, the memory 1554 may be, or include, non-volatile memory such as read-only memory (ROM), erasable programmable ROM (EPROM), electrically erasable programmable (EEPROM), flash memory, non-volatile RAM, ferroelectric RAM, phase-change memory (PCM), flash memory, and/or any other desired type of non-volatile memory device. Access to the memory 1554 is controlled by a memory controller. The individual memory devices may be of any number of different package types such as single die package (SDP), dual die package (DDP) or quad die package (Q17P). Any number of other memory implementations may be used, such as dual inline memory modules (DIMMs) of different varieties including but not limited to microDIMMs or MiniDIMMs.

Storage circuitry 1558 provides persistent storage of information such as data, applications, operating systems and so forth. In an example, the storage 1558 may be implemented via a solid-state disk drive (SSDD) and/or high-speed electrically erasable memory (commonly referred to as "flash memory"). Other devices that may be used for the storage 1558 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, a hard disk drive (HDD), micro HDD, of a combination thereof, and/or any other memory. The memory circuitry 1554 and/or storage circuitry 1558 may also incorporate three-dimensional (3D) cross-point (XPOINT) memories from Intel® and Micron®.

The memory circuitry 1554 and/or storage circuitry 1558 is/are configured to store computational logic 1583 in the form of software, firmware, microcode, or hardware-level instructions to implement the techniques described herein. The computational logic 1583 may be employed to store working copies and/or permanent copies of programming instructions, or data to create the programming instructions, for the operation of various components of system 1500 (e.g., drivers, libraries, application programming interfaces (APIs), etc.), an operating system of system 1500, one or more applications, and/or for carrying out the embodiments discussed herein. The computational logic 1583 may be stored or loaded into memory circuitry 1554 as instructions 1582, or data to create the instructions 1582, which are then accessed for execution by the processor circuitry 1552 to carry out the functions described herein. The processor circuitry 1552 and/or the acceleration circuitry 1564 accesses the memory circuitry 1554 and/or the storage circuitry 1558 over the interconnect (IX) 1556. The instructions 1582 direct the processor circuitry 1552 to perform a specific sequence or flow of actions, for example, as described with respect to flowchart(s) and block diagram(s) of operations and functionality depicted previously. The various elements may be implemented by assembler instructions supported by processor circuitry 1552 or high-level languages that may be compiled into instructions 1581, or data to create the instructions 1581, to be executed by the processor circuitry 1552. The permanent copy of the programming instructions may be placed into persistent storage devices of storage circuitry 1558 in the factory or in the field through, for example, a distribution medium (not shown), through a communication interface (e.g., from a distribution server (not shown)), over-the-air (OTA), or any combination thereof.

The IX 1556 couples the processor 1552 to communication circuitry 1566 for communications with other devices, such as a remote server (not shown) and the like. The communication circuitry 1566 is a hardware element, or collection of hardware elements, used to communicate over one or more networks 1563 and/or with other devices. In one example, communication circuitry 1566 is, or includes, transceiver circuitry configured to enable wireless communications using any number of frequencies and protocols such as, for example, the Institute of Electrical and Electronics Engineers (IEEE) 802.11 (and/or variants thereof), IEEE 802.23.4, Bluetooth® and/or Bluetooth® low energy (BLE), ZigBee®, LoRaWAN™ (Long Range Wide Area Network), a cellular protocol such as 3GPP LTE and/or Fifth Generation (5G)/New Radio (NR), and/or the like. Additionally or alternatively, communication circuitry 1566 is, or includes, one or more network interface controllers (NICs) to enable wired communication using, for example, an Ethernet connection, Controller Area Network (CAN), Local Interconnect Network (LIN), DeviceNet, ControlNet, Data Highway+, or PROFINET, among many others.

The IX 1556 also couples the processor 1552 to interface circuitry 1570 that is used to connect system 1550 with one or more external devices 1572. The external devices 1572 may include, for example, sensors, actuators, positioning circuitry (e.g., global navigation satellite system (GNSS)/Global Positioning System (GPS) circuitry), client devices, servers, network appliances (e.g., switches, hubs, routers, etc.), integrated photonics devices (e.g., optical neural network (ONN) integrated circuit (IC) and/or the like), and/or other like devices.

In some optional examples, various input/output (I/O) devices may be present within or connected to, the system 1550, which are referred to as input circuitry 1586 and output circuitry 1584 in FIG. 15. The input circuitry 1586 and output circuitry 1584 include one or more user interfaces designed to enable user interaction with the platform 1550 and/or peripheral component interfaces designed to enable peripheral component interaction with the platform 1550. Input circuitry 1586 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1584 may be included to show information or otherwise convey information, such as sensor readings, actuator position(s), or other like information. Data and/or graphics may be displayed on one or more user interface components of the output circuitry 1584. Output circuitry 1584 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD), LED displays, quantum dot displays, projectors, etc.), with the output of characters, graphics, multimedia objects, and the like being generated or produced from the operation of the platform 1550. The output circuitry 1584 may also include speakers and/or other audio emitting devices, printer(s), and/or the like. Additionally or alternatively, sensor(s) may be used as the input circuitry 1584 (e.g., an image capture device, motion capture device, or the like) and one or more actuators may be used as the output device circuitry 1584 (e.g., an actuator to provide haptic feedback or the like). Peripheral component interfaces may include, but are not limited to, a non-volatile memory port, a USB port, an audio jack, a power supply interface, etc. In some embodiments, a display or console hardware, in the context of the present system, may be used to provide output and receive input of an edge computing system; to manage components or services of an edge computing system; identify a state of an edge computing component or service; or to conduct any other number of management or administration functions or service use cases.

The components of the system 1550 may communicate over the IX 1556. The IX 1556 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 1556 may be a proprietary bus, for example, used in a SoC based system.

The number, capability, and/or capacity of the elements of system 1500 may vary, depending on whether computing system 1500 is used as a stationary computing device (e.g., a server computer in a data center, a workstation, a desktop computer, etc.) or a mobile computing device (e.g., a smartphone, tablet computing device, laptop computer, game console, IoT device, etc.). In various implementations, the computing device system 1500 may comprise one or more components of a data center, a desktop computer, a workstation, a laptop, a smartphone, a tablet, a digital camera, a smart appliance, a smart home hub, a network appliance, and/or any other device/system that processes data.

The techniques described herein can be performed partially or wholly by software or other instructions provided in a machine-readable storage medium (e.g., memory). The software is stored as processor-executable instructions (e.g., instructions to implement any other processes discussed herein). Instructions associated with the flowchart (and/or various embodiments) and executed to implement embodiments of the disclosed subject matter may be implemented as part of an operating system or a specific application, component, program, object, module, routine, or other sequence of instructions or organization of sequences of instructions.

The storage medium can be a tangible machine readable medium such as read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs)), among others.

The storage medium may be included, e.g., in a communication device, a computing device, a network device, a personal digital assistant, a manufacturing tool, a mobile communication device, a cellular phone, a notebook computer, a tablet, a game console, a set top box, an embedded system, a TV (television), or a personal desktop computer.

Some non-limiting examples of various embodiments are presented below.

Example 1 includes an apparatus, comprising: a first n-type region (910, 1010, 1210) comprising a first nMOS transistor (TN1) and a first gate connector (903, 1003, 1203); a second n-type region (911, 1011, 1211) comprising a second nMOS transistor (TN2) and a second gate connector (904, 1004, 1204); a first p-type region (950, 1050, 1150, 1250) below the first n-type region, the first p-type region comprising first (AXLp) and second (TP1) pMOS transistors; and a second p-type region (951, 1051, 1151, 1251) below the second n-type region, the second p-type region comprising third (TP2) and fourth (AXRp) pMOS transistors, wherein the first gate connector has an overlapping footprint with the first pMOS transistor (AXLp).

Example 2 includes the apparatus of Example 1, wherein: the first pMOS transistor (AXLp) is an access transistor coupled to a primary bit line (BL) and to a first node (N0); a control gate of the first pMOS transistor (AXLp) is coupled to a word line; the fourth pMOS transistor (AXRp) is an access transistor coupled to a complementary bit line (BLB) and to a second node (N1); a control gate of the fourth pMOS transistor (AXRp) is coupled to the word line; the word line is in a M0 metal layer above the first and second p-type regions; and the primary bit line and the complementary bit line are in a M2 metal layer above the M0 layer.

Example 3 includes the apparatus of Example 1 and 2, wherein: the first pMOS transistor (AXLp) is an access transistor coupled to a primary bit line (BL) and to a first node (N0); the fourth pMOS transistor (AXRp) is an access transistor coupled to a complementary bit line (BLB) and to a second node (N1); the primary bit line and the complementary bit line are in respective portions of a BM0 bottom metal layer shielded from one another by a respective portion of the BM0 bottom metal layer to carry Vss; and the BM0 bottom metal layer is below the first and second p-type regions.

Example 4 includes the apparatus of Examples 1-3, wherein: the second gate connector has an overlapping footprint with the fourth pMOS transistor (AXRp).

Example 5 includes the apparatus of Examples 1-4, wherein: the first pMOS transistor (AXLp) is an access transistor coupled to a primary bit line and to a first node (N0); the first gate connector is to connect a first portion (921, 1021, 1221) of the first node to a second portion (922, 1022, 1222) of the first node; the first portion of the first node does not extend from the first n-type region to the second n-type region; and the second portion of the first node extends from the first n-type region to the second n-type region.

Example 6 includes the apparatus of Example 5, wherein: the fourth pMOS transistor (AXRp) is an access transistor coupled to a complementary bit line and to a second node (N1); the second gate connector is to connect a first portion (923, 1023, 1223) of the second node to a second portion (920, 1020, 1220) of the second node; and the second portion of the second node extends from the first n-type region to the second n-type region.

Example 7 includes the apparatus of Examples 1-6, wherein: the second gate connector (904) has an overlapping footprint with the fourth pMOS transistor (AXRp); and the fourth pMOS transistor is an access transistor coupled to a complementary bit line.

Example 8 includes the apparatus of Examples 1-7, wherein: the first n-type region has an overlapping footprint with the first p-type region; and the second n-type region has an overlapping footprint with the second p-type region.

Example 9 includes the apparatus of Examples 1-8, wherein: the first nMOS transistor (TN1) and the second pMOS transistor (TP1) are in a first inverter (INV1) and have coupled control gates; and the second nMOS transistor (TN2) and the third pMOS transistor (TP2) are in a second inverter (INV2) and have coupled control gates.

Example 10 includes the apparatus of Examples 1-9, wherein: the apparatus comprises a six-transistor static random access memory cell.

Example 11 includes a static random access memory cell, comprising: first pMOS access transistor (AXLp) coupled to a primary bit line (BL) and to a first node (N0); a second pMOS access transistor (AXRp) coupled to a complementary bit line (BLB) and to a second node (N1); a first inverter (INV1) coupled to the first and second nodes, the first inverter comprises a first nMOS transistor (TN1) coupled to a first pMOS transistor (TP1); a second inverter (INV2) coupled to the first and second nodes, the second inverter comprises a second nMOS transistor (TN2) coupled to a second pMOS transistor (TP2); and a first gate connector (903, 1003, 1203) to connect a first portion (921, 1021, 1221) of the first node to a second portion (922, 1022, 1222) of the first node, wherein the first gate connector (903, 1003, 1203) is in a first n-type region, the first pMOS access transistor (AXLp) is in a first p-type region, and the first gate connector has an overlapping footprint with the first pMOS access transistor (AXLp).

Example 12 includes the apparatus of Example 11, further comprising: a second gate connector (904, 1004, 1204) to connect a first portion (923, 1023, 1223) of the second node and to a second portion (920, 1020, 1220) of the second node, wherein the second gate connector is in a second n-type region, the second pMOS access transistor (AXRp) is in a second p-type region, and the second gate connector has an overlapping footprint with the second pMOS access transistor (AXRp).

Example 13 includes the apparatus of Example 12, wherein: the first n-type region overlays the first p-type region and has an overlapping footprint with the first p-type region; and the second n-type region overlays the second p-type region and has an overlapping footprint with the second p-type region.

Example 14 includes the apparatus of Example 13, wherein: the first n-type region is separated from the second n-type region by an isolation region and the first p-type region is separated from the second p-type region by an isolation region.

Example 15 includes the apparatus of Example 12, wherein: the first gate connector is to connect a first portion (921, 1021, 1221) of the first node to a second portion (922, 1022, 1222) of the first node; the first portion of the first node does not extend from the first n-type region to the second n-type region; and the second portion of the first node extends from the first n-type region to the second n-type region.

Example 16 includes an apparatus, comprising: a first set (1460) of static random access memory (SRAM) cells; a second set (1470) of SRAM cells, the second set of SRAM cells are closer than the first set of SRAM cells to an associated sense amplifier (1430); a primary bit line and a complementary bit line in a first metal layer; and a primary bit line and a complementary bit line in a second metal layer, wherein the first set of SRAM cells but not the second set of SRAM cells are coupled to the primary bit line and the complementary bit line in the first metal layer, and second set of SRAM cells but not the first set of SRAM cells are coupled to the primary bit line and the complementary bit line in the second metal layer.

Example 17 includes the apparatus of Example 16, wherein: a number of SRAM cells in the second set of SRAM cells is at least twice a number of SRAM cells in the first set of SRAM cells.

Example 18 includes the apparatus of Example 16 or 17, wherein: the first metal layer is an overlaying M0 metal layer and the second metal layer is an underlying BM0 bottom metal layer.

Example 19 includes the apparatus of Examples 16-18, further comprising: a first multiplexer having inputs coupled to the primary bit line of the first metal layer and the primary bit line in the second metal layer, and an output coupled to the sense amplifier; and a second multiplexer having inputs coupled to the complementary bit line of the first metal layer and the complementary bit line in the second metal layer, and an output coupled to the sense amplifier.

Example 20 includes the apparatus of Example 19, wherein: the first multiplexer and the second multiplexer are operable in response to a common select signal.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus, comprising:
a first n-type region comprising a first nMOS transistor and a first gate connector;
a second n-type region comprising a second nMOS transistor and a second gate connector;
a first p-type region below the first n-type region, the first p-type region comprising first and second pMOS transistors; and
a second p-type region below the second n-type region, the second p-type region comprising third and fourth pMOS transistors, wherein the first gate connector has an overlapping footprint with the first pMOS transistor.

2. The apparatus of claim 1, wherein:
the first pMOS transistor is an access transistor coupled to a primary bit line and to a first node;
a control gate of the first pMOS transistor is coupled to a word line;
the fourth pMOS transistor is an access transistor coupled to a complementary bit line and to a second node;
a control gate of the fourth pMOS transistor is coupled to the word line;
the word line is in a M0 metal layer above the first and second p-type regions; and
the primary bit line and the complementary bit line are in a M2 metal layer above the M0 layer.

3. The apparatus of claim 1, wherein:
the first pMOS transistor is an access transistor coupled to a primary bit line and to a first node;
the fourth pMOS transistor is an access transistor coupled to a complementary bit line and to a second node;
the primary bit line and the complementary bit line are in respective portions of a BM0 bottom metal layer shielded from one another by a respective portion of the BM0 bottom metal layer to carry Vss; and
the BM0 bottom metal layer is below the first and second p-type regions.

4. The apparatus of claim 1, wherein:
the second gate connector has an overlapping footprint with the fourth pMOS transistor.

5. The apparatus of claim 1, wherein:
the first pMOS transistor is an access transistor coupled to a primary bit line and to a first node;
the first gate connector is to connect a first portion of the first node to a second portion of the first node;
the first portion of the first node does not extend from the first n-type region to the second n-type region; and
the second portion of the first node extends from the first n-type region to the second n-type region.

6. The apparatus of claim 5, wherein:
the fourth pMOS transistor is an access transistor coupled to a complementary bit line and to a second node;
the second gate connector is to connect a first portion of the second node to a second portion of the second node; and
the second portion of the second node extends from the first n-type region to the second n-type region.

7. The apparatus of claim 1, wherein:
the second gate connector has an overlapping footprint with the fourth pMOS transistor; and
the fourth pMOS transistor is an access transistor coupled to a complementary bit line.

8. The apparatus of claim 1, wherein:
the first n-type region has an overlapping footprint with the first p-type region; and
the second n-type region has an overlapping footprint with the second p-type region.

9. The apparatus of claim 1, wherein:
the first nMOS transistor and the second pMOS transistor are in a first inverter and have coupled control gates; and
the second nMOS transistor and the third pMOS transistor are in a second inverter and have coupled control gates.

10. The apparatus of claim 1, wherein the apparatus comprises a six- transistor static random access memory cell.

11. A static random access memory cell, comprising:
a first pMOS access transistor coupled to a primary bit line and to a first node;
a second pMOS access transistor coupled to a complementary bit line and to a second node N1;
a first inverter coupled to the first and second nodes, the first inverter comprises a first nMOS transistor coupled to a first pMOS transistor;
a second inverter coupled to the first and second nodes, the second inverter comprises a second nMOS transistor coupled to a second pMOS transistor; and
a first gate connector to connect a first portion of the first node to a second portion of the first node, wherein the first gate connector is in a first n-type region, the first pMOS access transistor is in a first p-type region, and the first gate connector has an overlapping footprint with the first pMOS access transistor.

12. The static random access memory cell of claim 11, further comprising:
a second gate connector to connect a first portion of the second node and to a second portion of the second node, wherein the second gate connector is in a second n-type region, the second pMOS access transistor is in a second p-type region, and the second gate connector has an overlapping footprint with the second pMOS access transistor.

13. The static random access memory cell of claim 12, wherein:
the first n-type region overlays the first p-type region and has an overlapping footprint with the first p-type region; and
the second n-type region overlays the second p-type region and has an overlapping footprint with the second p-type region.

14. The static random access memory cell of claim 13, wherein:
the first n-type region is separated from the second n-type region by an isolation region and the first p-type region is separated from the second p-type region by an isolation region.

15. The static random access memory cell of claim 12, wherein:
the first gate connector is to connect a first portion of the first node to a second portion of the first node;
the first portion of the first node does not extend from the first n-type region to the second n-type region; and
the second portion of the first node extends from the first n-type region to the second n- type region.

16. An apparatus, comprising:
a first set of static random access memory (SRAM) cells;
a second set (of SRAM cells, the second set of SRAM cells are closer than the first set of SRAM cells to an associated sense amplifier;

a first primary bit line and a first complementary bit line in a first metal layer; and a second primary bit line and a second complementary bit line in a second metal layer, wherein the first set of SRAM cells but not the second set of SRAM cells are coupled to the first primary bit line and the first complementary bit line in the first metal layer, and second set of SRAM cells but not the first set of SRAM cells are coupled to the second primary bit line and the second complementary bit line in the second metal layer.

17. The apparatus of claim 16, wherein:

a number of SRAM cells in the second set of SRAM cells is at least twice a number of SRAM cells in the first set of SRAM cells.

18. The apparatus of claim 16, wherein:

the first metal layer is an overlaying M0 metal layer and the second metal layer is an underlying BM0 bottom metal layer.

19. The apparatus of claim 16, further comprising:

a first multiplexer having inputs coupled to the first primary bit line of the first metal layer and the second primary bit line in the second metal layer, and an output coupled to the sense amplifier; and a second multiplexer having inputs coupled to the first complementary bit line of the first metal layer and the second complementary bit line in the second metal layer, and an output coupled to the sense amplifier.

20. The apparatus of claim 19, wherein:

the first multiplexer and the second multiplexer are operable in response to a common select signal.

\* \* \* \* \*